US012628062B2

(12) United States Patent
Bouda et al.

(10) Patent No.: US 12,628,062 B2
(45) Date of Patent: May 12, 2026

(54) APPARATUSES, COMPUTER-IMPLEMENTED METHODS, AND COMPUTER PROGRAM PRODUCTS FOR VEHICLE HANDOVER AND ROAMING USING GROUND CONTROL STATIONS

(71) Applicant: Honeywell Aerospace SAS, Toulouse (FR)

(72) Inventors: Tomas Bouda, Brno (CZ); Jan Beran, Kanice (CZ); Eva Josth Adamova, Brno (CZ); Pavel Kolcarek, Ochoz u Brna (CZ)

(73) Assignee: HONEYWELL AEROSPACE SAS, Toulouse (FR)

( * ) Notice: Subject to any disclaimer, the term of this patent is extended or adjusted under 35 U.S.C. 154(b) by 325 days.

(21) Appl. No.: 18/366,425

(22) Filed: Aug. 7, 2023

(65) Prior Publication Data

US 2025/0056362 A1    Feb. 13, 2025

(51) Int. Cl.
*H04W 36/32*    (2009.01)
*H04W 36/08*    (2009.01)

(52) U.S. Cl.
CPC .......... *H04W 36/32* (2013.01); *H04W 36/08* (2013.01)

(58) Field of Classification Search
CPC .............................. H04W 36/32; H04W 36/08
See application file for complete search history.

(56) References Cited

U.S. PATENT DOCUMENTS

| 8,315,788 | B2 | 11/2012 | Surnilla et al. |
| 10,084,615 | B2 | 9/2018 | Hong et al. |
| 10,134,269 | B2 | 11/2018 | Xie et al. |
| 11,195,345 | B2 | 12/2021 | Nilsson et al. |
| 11,337,127 | B2 | 5/2022 | Dudzinski et al. |

(Continued)

FOREIGN PATENT DOCUMENTS

| AT | 16013 U1 | 10/2018 |
| CN | 105334863 A | 2/2016 |

(Continued)

OTHER PUBLICATIONS

Extended European Search Report Mailed on Dec. 2, 2024 for EP Application No. 24177075, 13 page(s).

(Continued)

*Primary Examiner* — Justin Y Lee
(74) *Attorney, Agent, or Firm* — ALSTON & BIRD LLP

(57) ABSTRACT

Embodiments of the disclosure provide for handover or roaming of unmanned vehicles and missions between ground control stations (GCSs) of the same or different ground control centers (GCCs). Some embodiments receive a control change indication indicative of reassignment of a vehicle associated with a first GCS that is associated with a first GCC. Some embodiments reassign the vehicle from a first GCS to a second GCS associated with the GCC to enable the second GCS to newly access data corresponding to the vehicle via the master control system to enable control of the vehicle. Some embodiments reassign the vehicle from a first GCC to a second GCC by copying data corresponding to the vehicle from the master control system of the first GCC to a second master control system of a second GCC to enable control of the vehicle via at least one GCS of the second GCC.

20 Claims, 9 Drawing Sheets

(56) References Cited

U.S. PATENT DOCUMENTS

| | | | |
|---|---|---|---|
| 2011/0292907 A1 | 12/2011 | Tieftrunk et al. | |
| 2015/0327136 A1 | 11/2015 | Kim et al. | |
| 2018/0234164 A1 | 8/2018 | Hardy et al. | |
| 2019/0391575 A1 | 12/2019 | Hortner | |
| 2021/0195495 A1* | 6/2021 | Hong | H04W 36/08 |
| 2023/0362752 A1* | 11/2023 | Vivanco | H04W 16/28 |
| 2024/0224152 A1* | 7/2024 | Fang | H04W 36/324 |

FOREIGN PATENT DOCUMENTS

| | | |
|---|---|---|
| CN | 110456824 A | 11/2019 |
| CN | 113377129 B | 11/2021 |
| CN | 109254590 B | 9/2022 |
| EP | 2391033 B1 | 11/2018 |
| KR | 10-2023-0026024 A | 2/2023 |
| WO | 2015/140795 A1 | 9/2015 |
| WO | 2019/079927 A1 | 5/2019 |
| WO | 2021/035641 A1 | 3/2021 |
| WO | 2021/179161 A1 | 9/2021 |
| WO | 2022/067555 A1 | 4/2022 |

OTHER PUBLICATIONS

Pipistrel, "Air Cargo," Nuuva V300, 11 pages, (2023). [Retrieved from the Internet Sep. 8, 2023: URL: <https://www.pipistrel-aircraft.com/air-cargo/#1680717339574-55a6eab5-11771680811899143168088441915716812 30128279>].

UAV Navigation, "GCS Handover With UAV Navigation Flight Control System," 3 pages, (Apr. 13, 2022). [Retrieved from the Internet Sep. 7, 2023: URL: <https://www.uavnavigation.com/sites/default/files/docs/2022-04/handover-en.pdf>].

* cited by examiner

800

APPARATUSES, COMPUTER-IMPLEMENTED METHODS, AND COMPUTER PROGRAM PRODUCTS FOR VEHICLE HANDOVER AND ROAMING USING GROUND CONTROL STATIONS

TECHNOLOGICAL FIELD

Embodiments of the present disclosure are generally directed to control handover and roaming of remote pilotable vehicles using ground control stations.

BACKGROUND

Increasing adoption of different vehicle mobility uses, for example personal aerial vehicles and/or unmanned aerial mobility (UAM) infrastructure for various purposes may present challenges to ensuring air and ground safety. For example, existing air control infrastructure may be limited to manned aircraft management, such as dispatching of commercial jetliners and other manned aircraft using air-to-ground communications between a human pilot and human air traffic support personnel, or otherwise fail to sufficiently provide data between control systems. However, such approaches may be insufficient and/or improperly configured for managing missions of unmanned aerial vehicles (UAVs), particularly those controlled from the ground as a cluster of several UAVs that transverse around various zones.

Applicant has discovered various technical problems associated with management of vehicle missions and related data. Through applied effort, ingenuity, and innovation, Applicant has solved many of these identified problems by developing the embodiments of the present disclosure, which are described in detail below.

BRIEF SUMMARY

In general, embodiments of the present disclosure herein provide for automated transition of management for vehicle missions among remote ground operators, ground control stations (GCSs), and ground control centers (GCCs), such as in instances of mission handover between GCSs associated with a particular GCC, or mission roaming between a GCS of a first GCC to a GCS of at least one other GCC. Other implementations for vehicle mission handover and roaming will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method for vehicle handover is provided. The computer-implemented method is executable utilizing any of a myriad of computing device(s) and/or combinations of hardware, software, firmware. In some example embodiments an example computer-implemented method includes In some example embodiments an example computer-implemented method includes establishing a connection between a first ground control station (GCS) with a ground control center (GCC), the GCC associated with a master control system connected to the first GCS. In some example embodiments, the first GCS is assigned at least one vehicle to enable control of each vehicle of the at least one vehicle and each is associated with one of a plurality of mission data objects stored via the master control system of the GCC. In some example embodiments, the computer-implemented method includes receiving a control change indication from the first GCS or the master control system of the GCC, the control change indication indicative of reassignment of a subset of the at least one vehicle. In some example embodiments, the computer-implemented method includes reassigning, in real-time from receiving the control change indication, the subset of the at least one vehicle from the first GCS to a second GCS associated with the GCC, where the reassignment to the second GCS enables the second GCS to control the subset of the at least one vehicle by newly accessing data corresponding to the subset of the at least one vehicles via the master control system.

In some example embodiments, the computer-implemented method further includes, in response to reassigning the subset of the at least one vehicle from the first GCS to the second GCS, causing rendering of a ground control interface on the second GCS. In some example embodiments, the ground control interface includes mission data indicative of a subset of the plurality of mission data objects and the mission data is based on the data corresponding to the subset of the at least one vehicles that were reassigned.

In some example embodiments, the computer-implemented method includes receiving the control change indication in response to a workload at the first GCS exceeding a predetermined threshold. In some example embodiments, the data corresponding to the subset of the at least one vehicle is centrally stored at the GCC. In some example embodiments, the computer-implemented method includes receiving the control change indication in response to detection of an off-nominal event at the first GCS or at one of the subset of the at least one vehicle. In some example embodiments, the computer-implemented method includes receiving the control change indication in response to receipt of a user input at the first GCS, where the user input indicates a request to reassign the subset of the at least one vehicle. In some example embodiments, the computer-implemented method includes receiving the control change indication in response to detection of a fault at the first GCS. In some example embodiments, the computer-implemented method includes receiving the control change indication in response to detection of an emergency at the first GCS or an operating entity of the GCS.

In some example embodiments, the GCC is a first GCC. In some example embodiments, the computer-implemented method further includes receiving a location for each of the at least one vehicle and detecting an indication that the location of a particular vehicle of the subset of the at least one vehicle is outside of a first geozone associated with the first GCC or is within a threshold distance of a second geozone associated with a second GCC. In some example embodiments, the computer-implemented method includes, in real-time from detecting the indication, reassigning the particular vehicle from the first GCC to the second GCC by copying the data corresponding to the particular vehicle from the master control system of the first GCC to a second master control system of the second GCC to enable control of the particular vehicle via at least one GCS of the second GCC.

In some example embodiments, the data corresponding to the subset of the at least one vehicle includes one or more vehicle statuses. In some example embodiments, the data corresponding to the subset of the at least one vehicle further includes a flight plan. In some example embodiments, the data corresponding to the subset of the at least one vehicle further includes a history of communication with one or more airspace-controlling entities. In some example embodiments, the computer-implemented method further includes causing rendering of a ground control interface at the second GCS. In some example embodiments, the ground control interface includes a user input field indicative of a request to reassign the at least one vehicle from the first GCS to the second GCS. In some example embodiments, the ground control interface further includes mission data indicative of a subset of the plurality of mission data objects, where the mission data is based on the data corresponding to the subset of the at least one vehicles that were reassigned.

In some example embodiments, the computer-implemented method further includes receiving, from the second GCS, user input to the user input field of the ground control interface. In some example embodiments, the user input is indicative of an acceptance of reassignment of the subset of the at least one vehicle to the second GCS. In some example embodiments, the computer-implemented method includes reassigning, in real-time from receiving the user input, the subset of the at least one vehicle from the first GCS to the second GCS.

In some example embodiments, the computer-implemented method further includes updating a rendering of a ground control interface at the first GCS to indicate reassignment of the subset of the at least one vehicle from the first GCS to the second GCS. In some example embodiments, the computer-implemented method further includes enabling an application server associated with the second GCS to access the data corresponding to the subset of the at least one vehicle. In some example embodiments, the computer-implemented method further includes providing to the first GCS a notification indicating the reassignment of the subset of the at least one vehicle from the first GCS to the second GCS. In some embodiments, the computer-implemented method further includes storing, via the master control system, the data corresponding to the subset of the at least one vehicle. In some embodiments, the data corresponding to the subset of the at least one vehicle includes mission data that enables the second GCS to monitor and control at least one mission associated with the subset of the at least one mission. In some embodiments, the mission data includes a travel pathway for the at least one mission. In some embodiments, the mission data further includes data indicative of a payload associated with the at least one mission. In some embodiments, the data corresponding to the subset of the at least one vehicle includes vehicle data that enables the second GCS to track a location of the subset of the at least one vehicle. In some embodiments, the data corresponding to the subset of the at least one vehicle includes tactical data that enables the second GCS to access and initiate commands for controlling the subset of the at least one vehicle. In some embodiments, the computer-implemented method further includes causing the second GCS to store at least a portion of the data corresponding to the subset of the at least one vehicle.

In accordance with another aspect of the present disclosure, a computing apparatus for vehicle handover is provided. The computing apparatus in some embodiments includes at least one processor and at least one non-transitory memory, the at least non-transitory one memory having computer-coded instructions stored thereon. The computer-coded instructions in execution with the at least one processor causes the apparatus to perform any one of the example computer-implemented methods described herein. In some other embodiments, the computing apparatus includes means for performing each step of any of the computer-implemented methods described herein.

In accordance with another aspect of the present disclosure, a computer program product for vehicle handover is provided. The computer program product in some embodiments includes at least one non-transitory computer-readable storage medium having computer program code stored thereon. The computer program code in execution with at least one processor is configured for performing any one of the example computer-implemented methods described herein.

In accordance with another aspect of the disclosure, a computer-implemented method for vehicle roaming is provided. The computer-implemented method is executable utilizing any of a myriad of computing device(s) and/or combinations of hardware, software, firmware. In some example embodiments an example computer-implemented method includes monitoring data associated with a first ground control station (GCS) and a plurality of vehicles assigned to the first GCS. In some example embodiments, the first GCS is associated with a first ground control center (GCC) associated with a first master control system connected to the first GCS. In some example embodiments, assignment of the first GCS to the plurality of vehicles via the first master control system enables the first GCS to control each vehicle in the plurality of vehicles. In some example embodiments, the computer-implemented method includes determining the data associated with the first GCS and the plurality of vehicles assigned to the first GCS satisfies at least one roaming condition. In some example embodiments, the computer-implemented method includes, in real-time from determining satisfaction of the at least one roaming condition, reassigning one or more vehicles of the plurality of vehicles from the first GCS and the first GCC to a second GCC by copying data corresponding to the one or more vehicles from the first master control system to a second master control system associated with the second GCC to enable control of the one or more vehicles via at least one GCS of the second GCC.

In some example embodiments, the data associated with the first GCS and the plurality of vehicles includes a location of each of the plurality of vehicles. In some example embodiments, the computer-implemented method further includes receiving the location of each of the plurality of vehicles. In some example embodiments, the computer-implemented method further includes determining satisfaction of the at least one roaming condition in response to detecting an indication that the location of the one or more vehicles is outside of a first geozone associated with the first GCC. In some example embodiments, the computer-implemented method includes determining satisfaction of the at least one roaming condition in response to detecting an indication that the location of the one or more vehicles is within a threshold distance of a second geozone associated with the second GCC. In some example embodiments, the computer-implemented method includes determining satisfaction of the at least one roaming condition in response to detecting an indication that the location of the one or more vehicles is within a threshold distance of an artificial boundary. In some example embodiments, the artificial boundary is at least one of a country boundary, a regional boundary, or a city boundary. In some example embodiments, the artificial boundary is an airspace boundary defined by an airspace-controlling entity.

In some example embodiments, the data associated with the first GCS and the plurality of vehicles includes a user input received at the first GCS, where the user input is indicative of a request to roam the one or more vehicles. In some example embodiments, the computer-implemented method further includes determining satisfaction of the at least one roaming condition in response to the request. In some example embodiments, the data associated with the first GCS and the plurality of vehicles includes a power status of the first GCC. In some example embodiments, the computer-implemented method further includes determining satisfaction of the at least one roaming condition in response to the power status indicating a power failure at the first GCC. In some example embodiments, the data associated with the first GCS and the plurality of vehicles includes a communication status of the first GCC. In some example embodiments, the computer-implemented method further includes determining satisfaction of the at least one roaming condition in response to the communication status indicating a communication failure at the first GCC.

In some example embodiments, the data associated with the first GCS and the plurality of vehicles assigned to the first GCS includes an indication of an emergency at the first GCC. In some example embodiments, the computer-implemented method further includes determining satisfaction of the at least one roaming condition in response to the indication of the emergency at the first GCC. In some example embodiments, the emergency at the first GCC includes a fire or a flood at the first GCC. In some example embodiments, the data associated with the first GCS and the plurality of vehicles assigned to the first GCS includes an indication of a GCS workload at the first GCC. In some example embodiments, the computer-implemented method further includes determining satisfaction of the at least one roaming condition based on the indication of the GCS workload at the first GCC. In some example embodiments, the at least one roaming condition includes a GCS workload threshold. In some example embodiments, the computer-implemented method further includes determining satisfaction of the at least one roaming condition in response to determining the GCS workload exceeds the GCS workload threshold.

In some example embodiments, the computer-implemented method further includes causing rendering of a ground control interface at the second GCS of the second GCC via the second master control system, where the ground control interface includes mission data indicative of one or more mission data objects corresponding to the one or more vehicles reassigned to the second GCS. In some example embodiments, the computer-implemented method further includes providing a notification to the first GCS, where the notification indicates the reassignment of the one or more vehicles from the first GCS and the first GCC to the second GCC. In some example embodiments, the computer-implemented method further includes providing, to the second master control system, a request to reassign the one or more vehicles from the first GCS and the first GCC to the second GCC and determining satisfaction of the at least one roaming condition in response to detecting an indication of acceptance of the request from the second master control system. In some example embodiments, the second GCC, via the second master control system, renders a graphical user interface (GUI) including the request on the at least one GCS and the acceptance of the request is detected in response to receipt of user input to the GUI at the at least one GCS.

In accordance with another aspect of the present disclosure, a computing apparatus for vehicle roaming is provided. The computing apparatus in some embodiments includes at least one processor and at least one non-transitory memory, the at least non-transitory one memory having computer-coded instructions stored thereon. The computer-coded instructions in execution with the at least one processor causes the apparatus to perform any one of the example computer-implemented methods described herein. In some other embodiments, the computing apparatus includes means for performing each step of any of the computer-implemented methods described herein.

In accordance with another aspect of the present disclosure, a computer program product for vehicle roaming is provided. The computer program product in some embodiments includes at least one non-transitory computer-readable storage medium having computer program code stored thereon. The computer program code in execution with at least one processor is configured for performing any one of the example computer-implemented methods described herein.

BRIEF DESCRIPTION OF THE DRAWINGS

Figure 1:
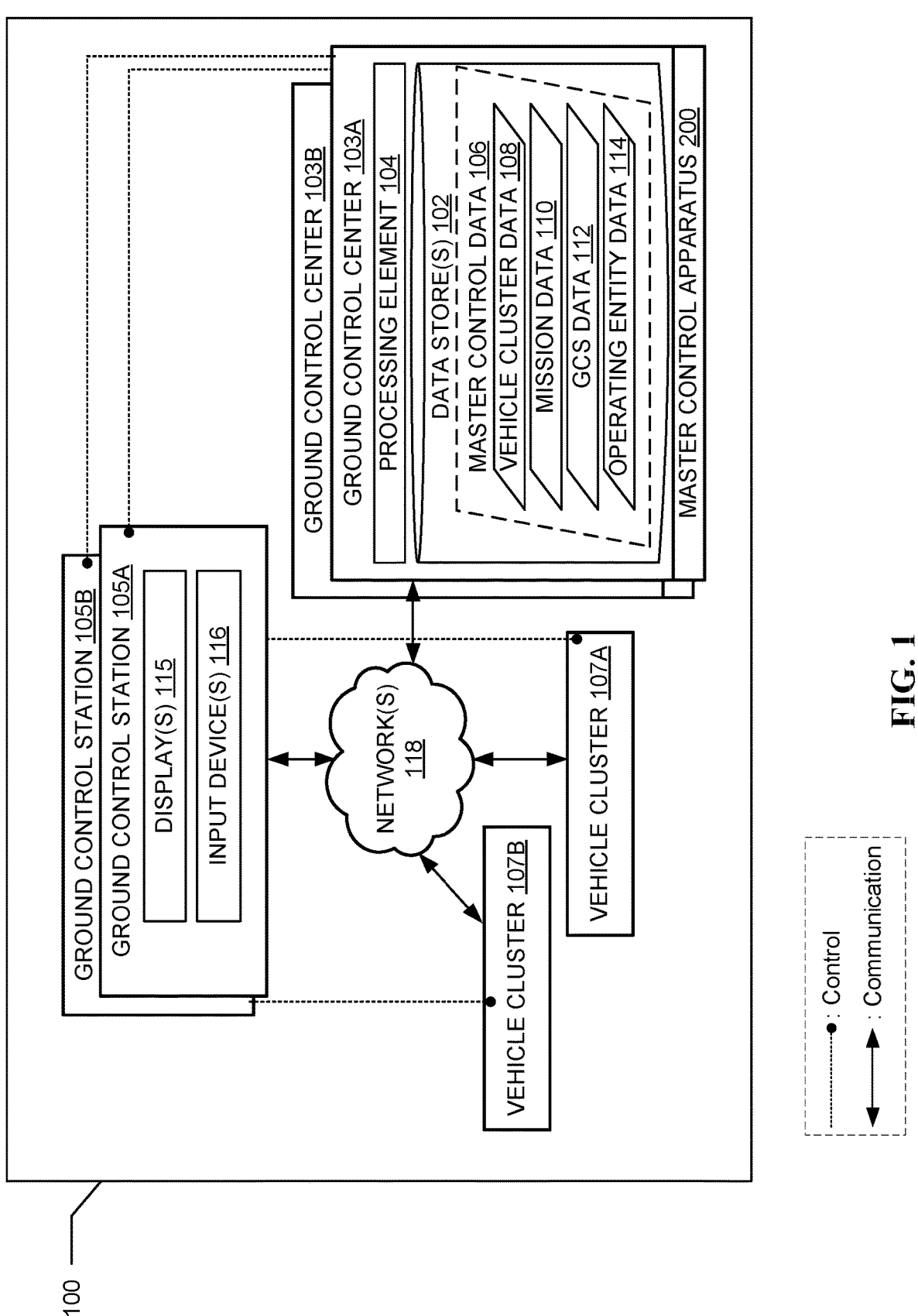

Having thus described the embodiments of the disclosure in general terms, reference now will be made to the accompanying drawings, which are not necessarily drawn to scale, and wherein:

FIG. 1 illustrates a block diagram of a networked environment that may be specially configured within which embodiments of the present disclosure may operate.

Figure 2:
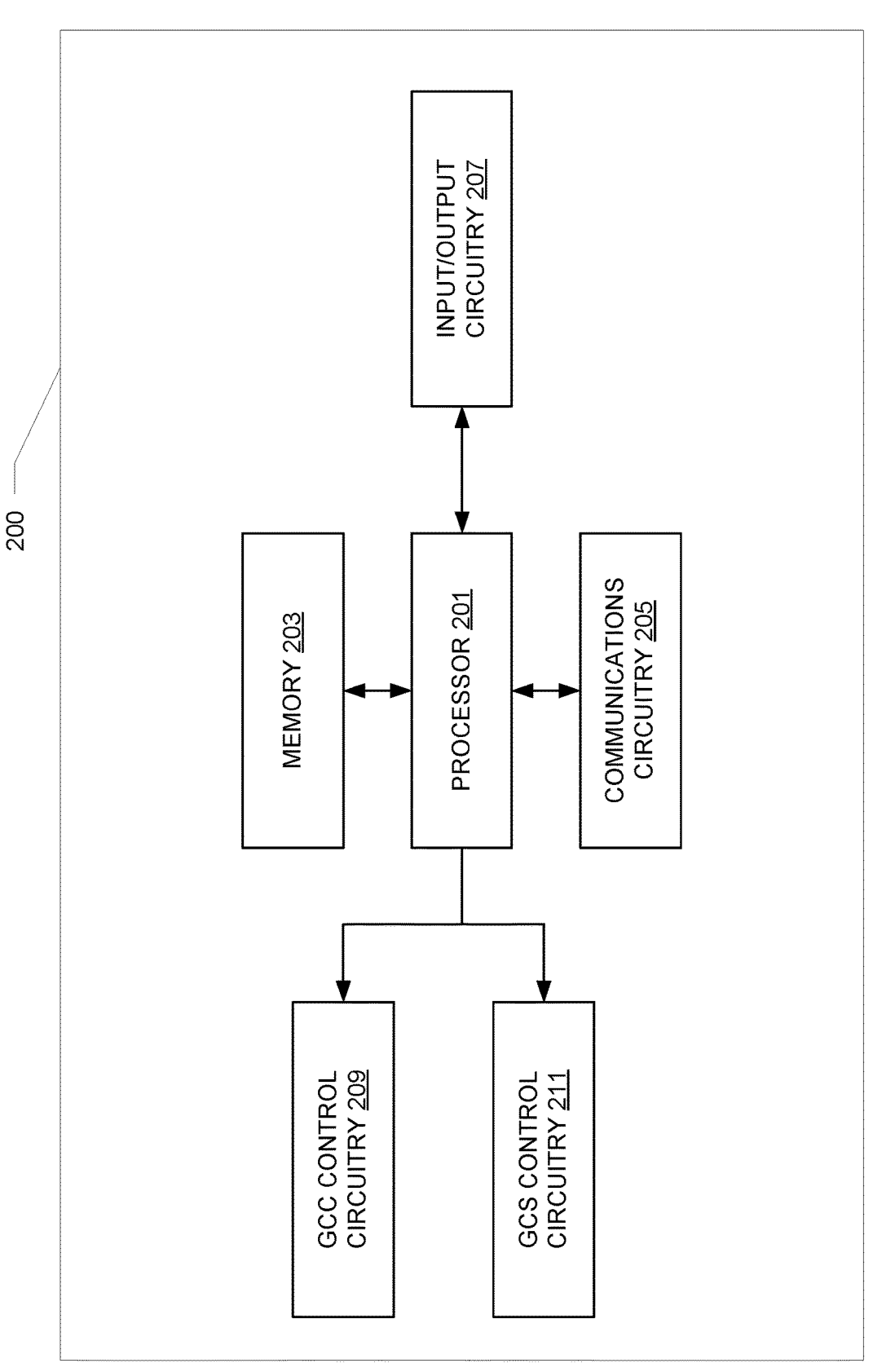

FIG. 2 illustrates a block diagram of an example apparatus that may be specially configured in accordance with at least some example embodiments of the present disclosure.

Figure 3:
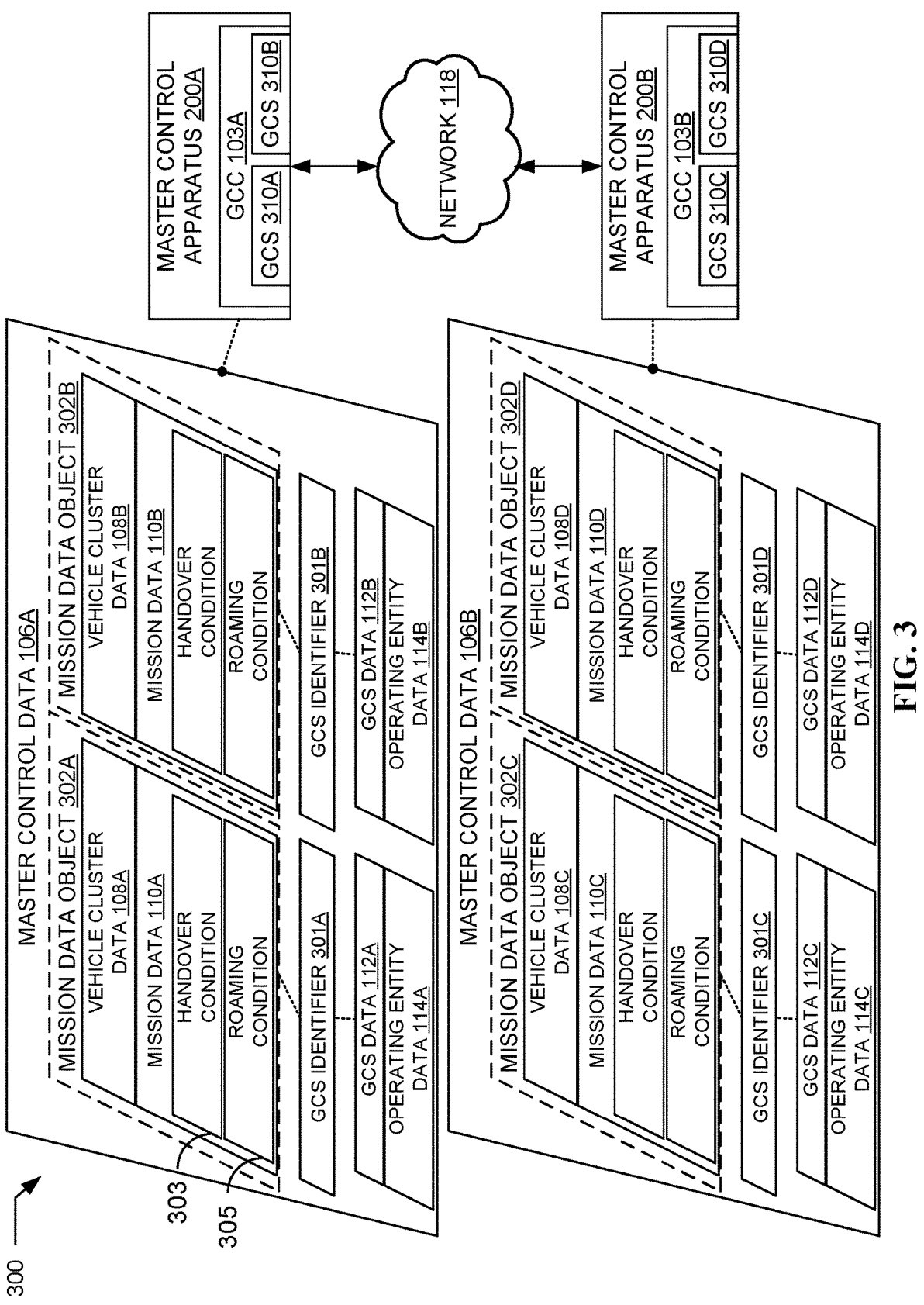

FIG. 3 illustrates an example data architecture in accordance with at least some example embodiments of the present disclosure.

Figure 4:
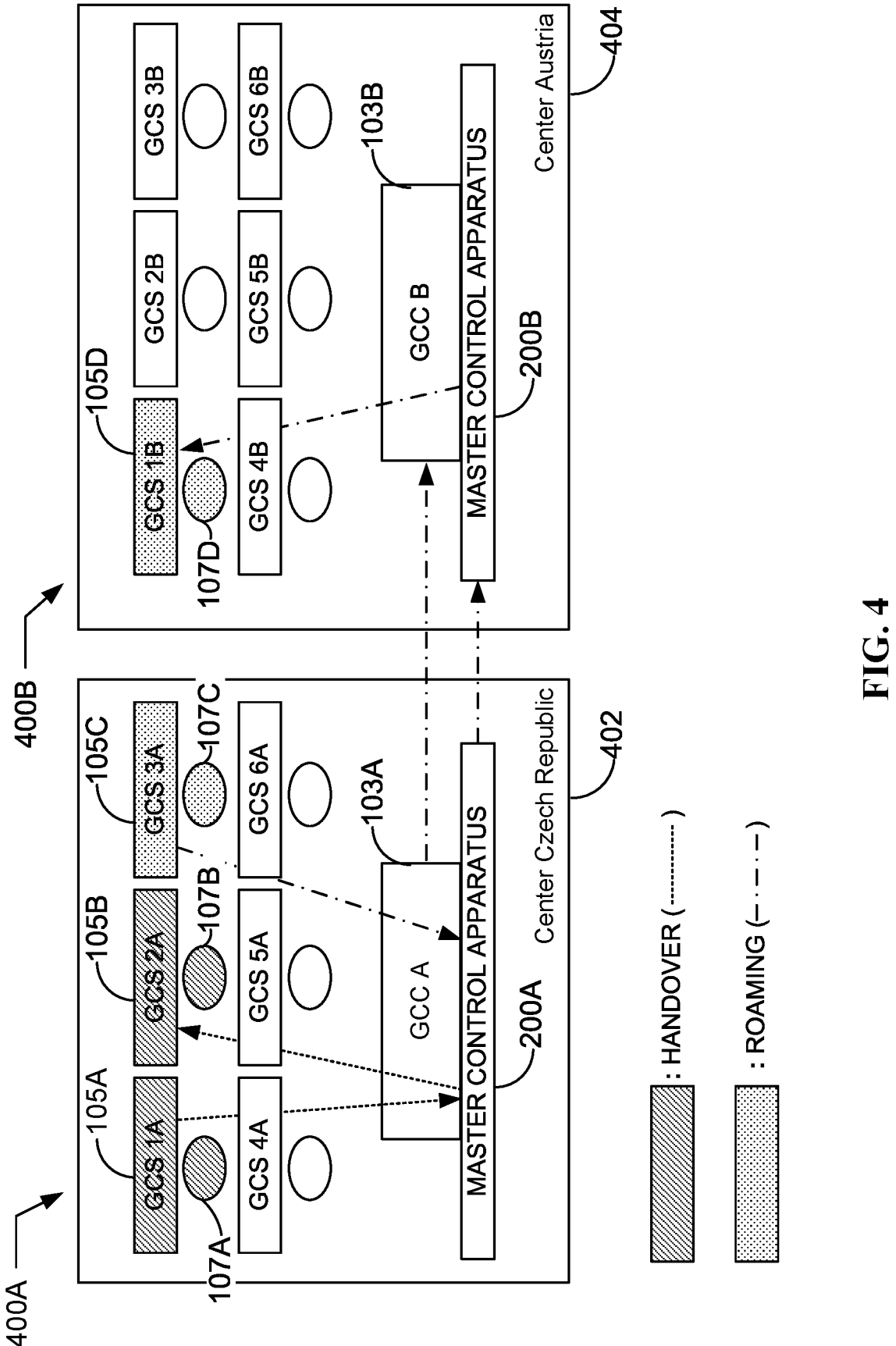

FIG. 4 illustrates a diagram of example workflows for vehicle handover and vehicle roaming in accordance with at least some example embodiments of the present disclosure.

Figure 5:
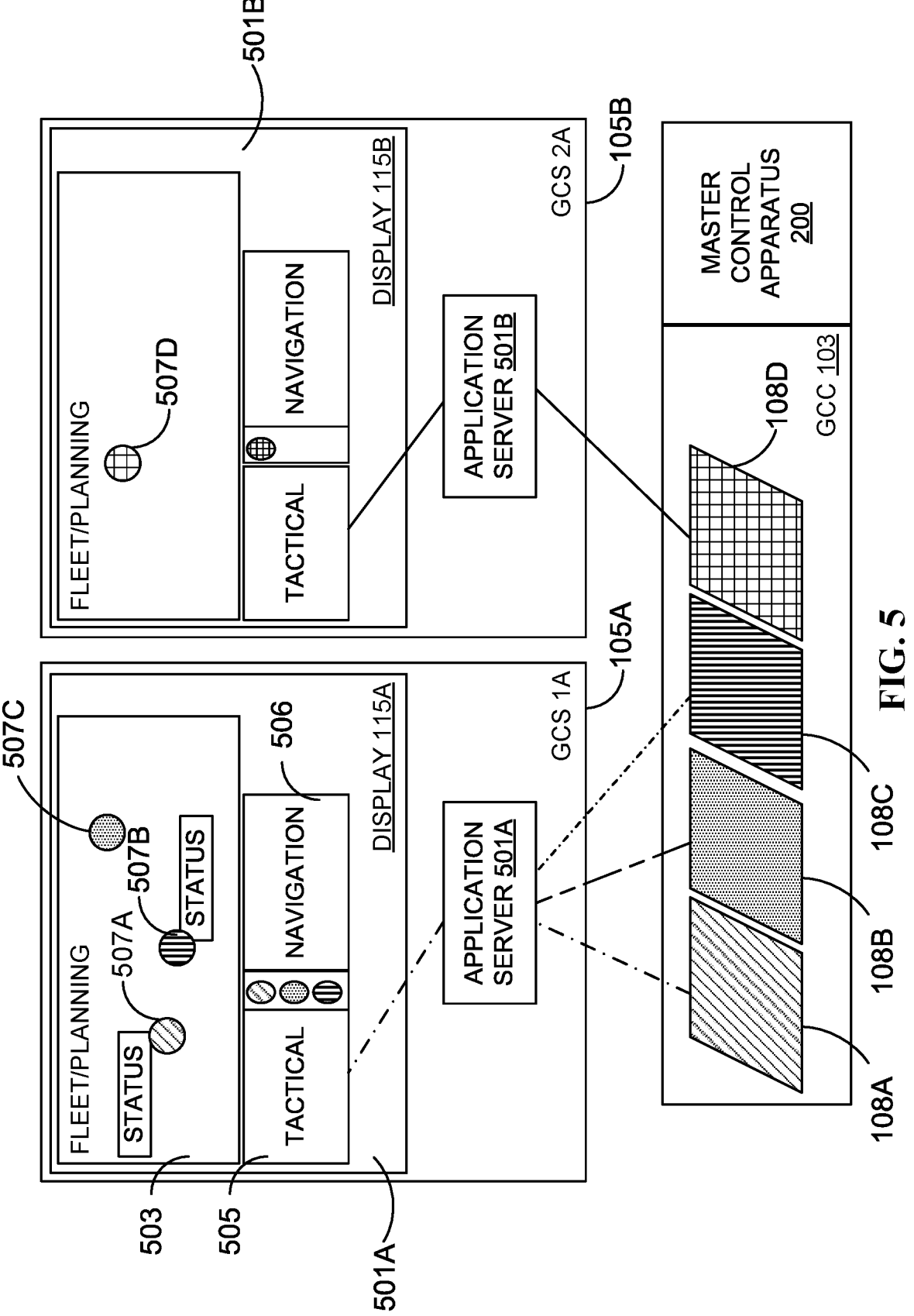

FIG. 5 illustrates a diagram of an example workflow for mission reassignment in vehicle handover in accordance with at least some example embodiments of the present disclosure.

Figure 6:
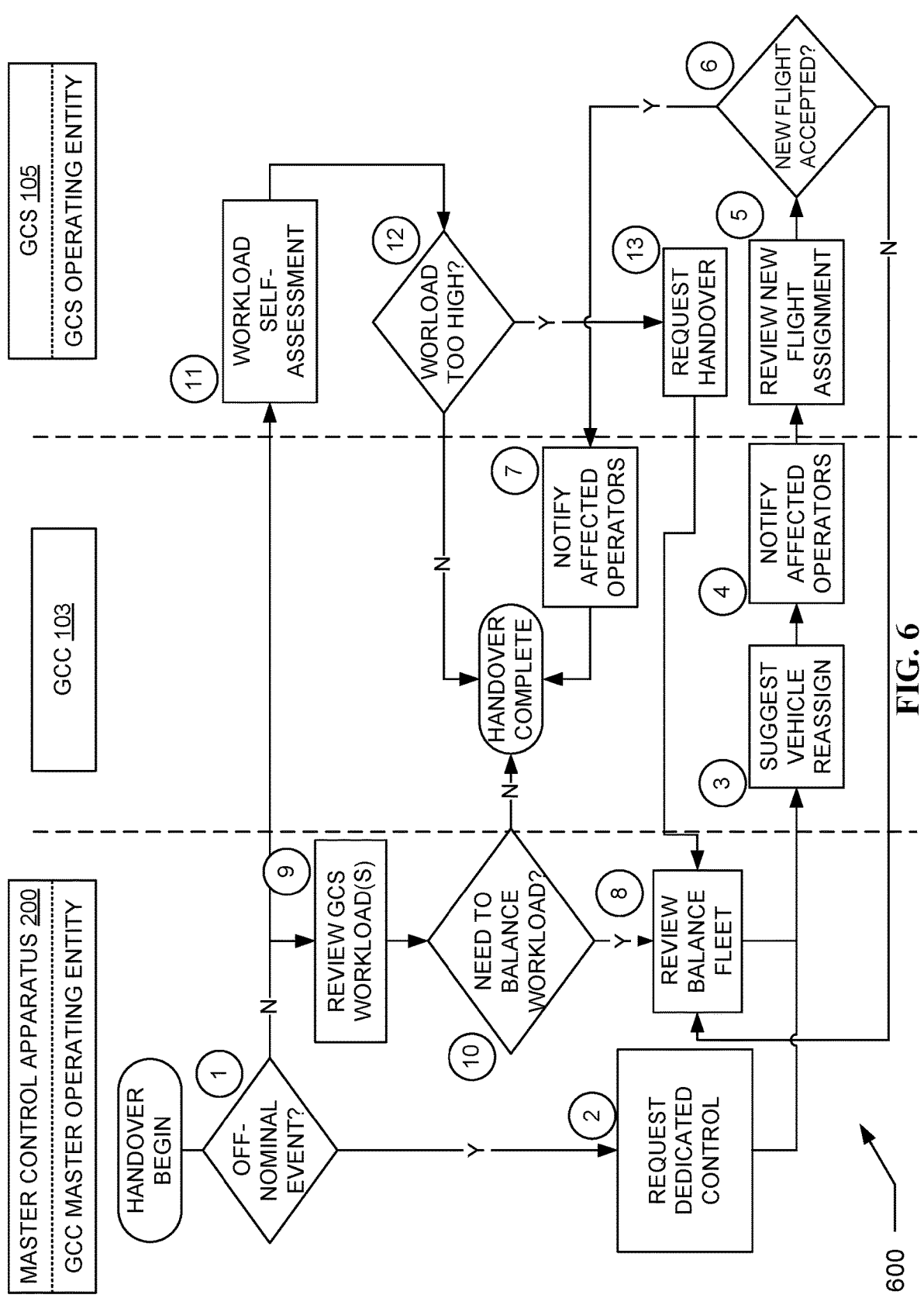

FIG. 6 illustrates a functional band diagram depicting operations of an example workflow for vehicle handover in accordance with at least some example embodiments of the present disclosure.

Figure 7:
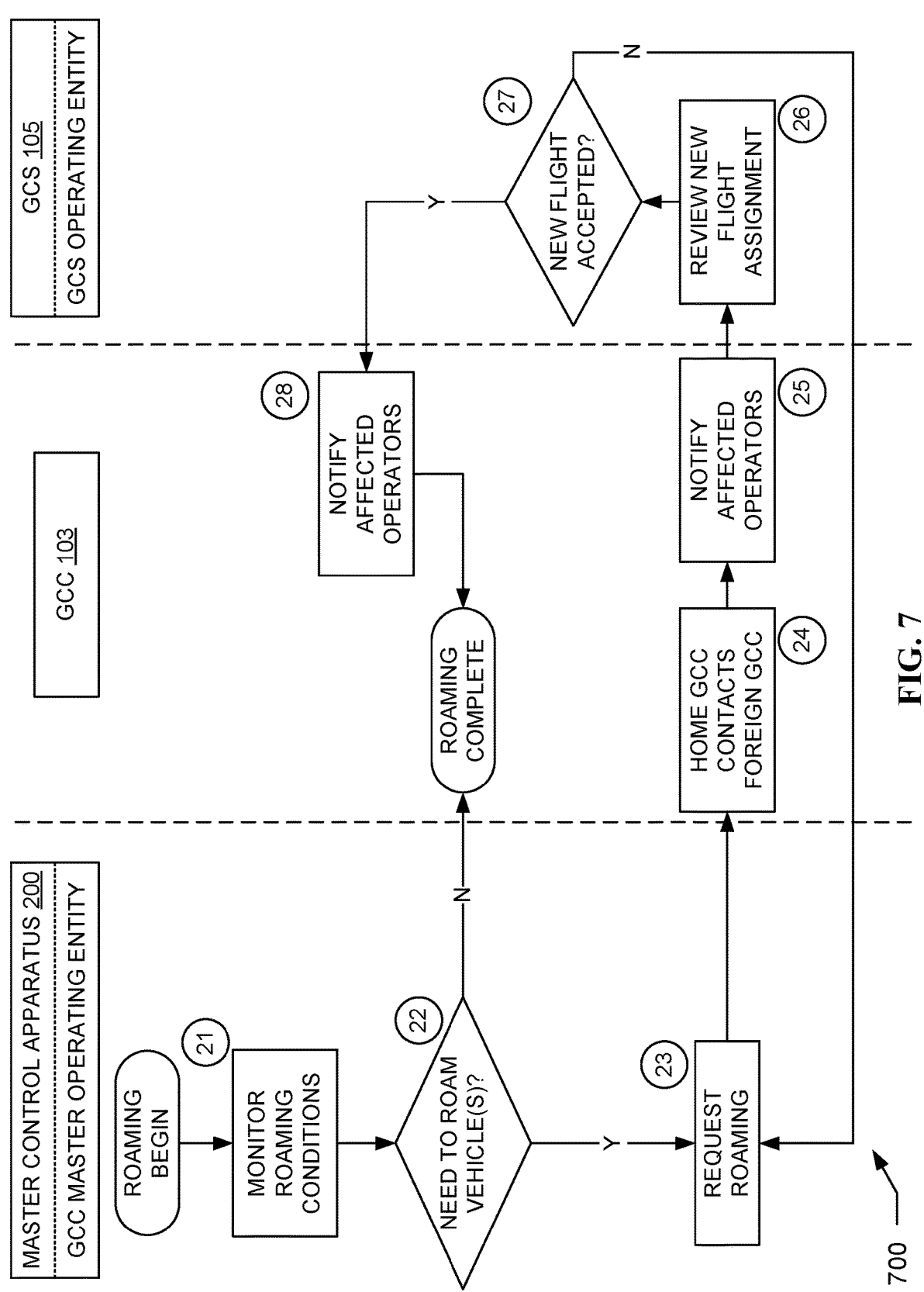

FIG. 7 illustrates a functional band diagram depicting operations of an example workflow for vehicle roaming in accordance with at least some example embodiments of the present disclosure.

Figure 8:
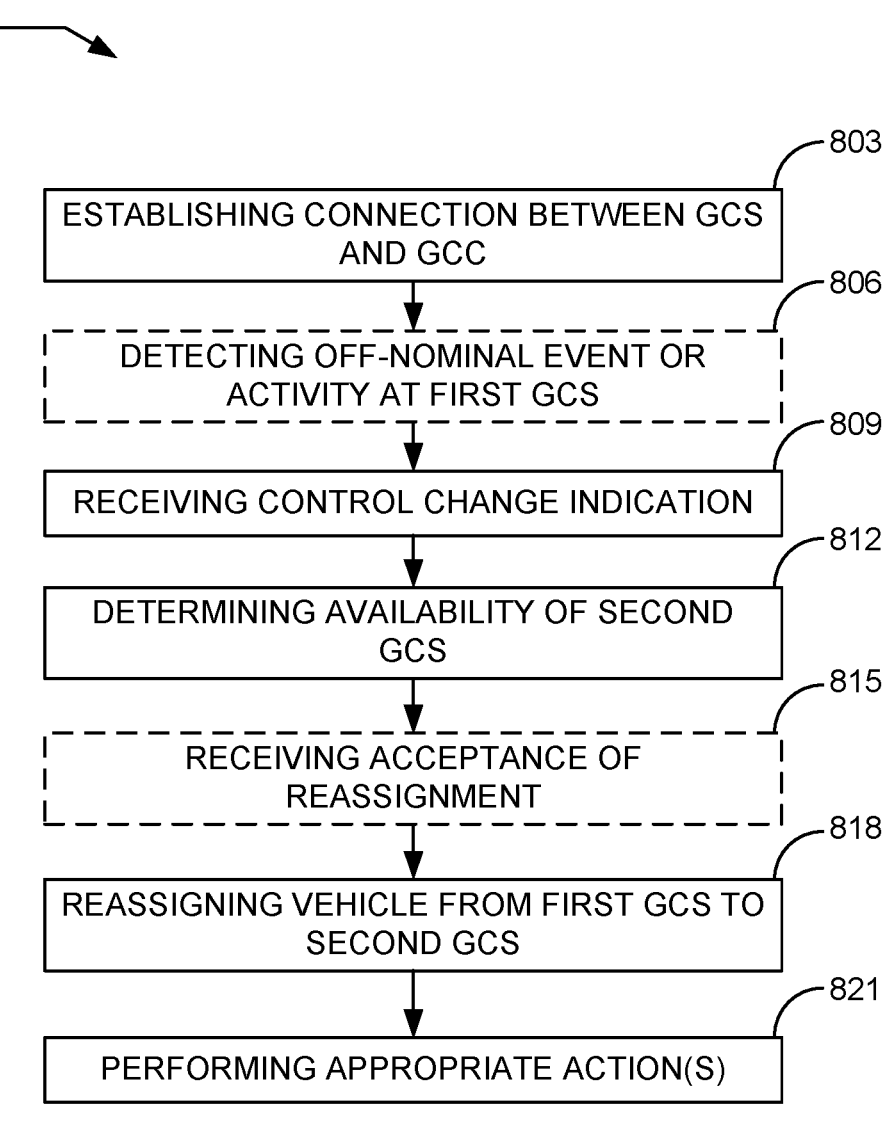

FIG. 8 illustrates a flowchart depicting operations of an example process for vehicle handover using ground control stations (GCSs) in accordance with at least some example embodiments of the present disclosure.

Figure 9:
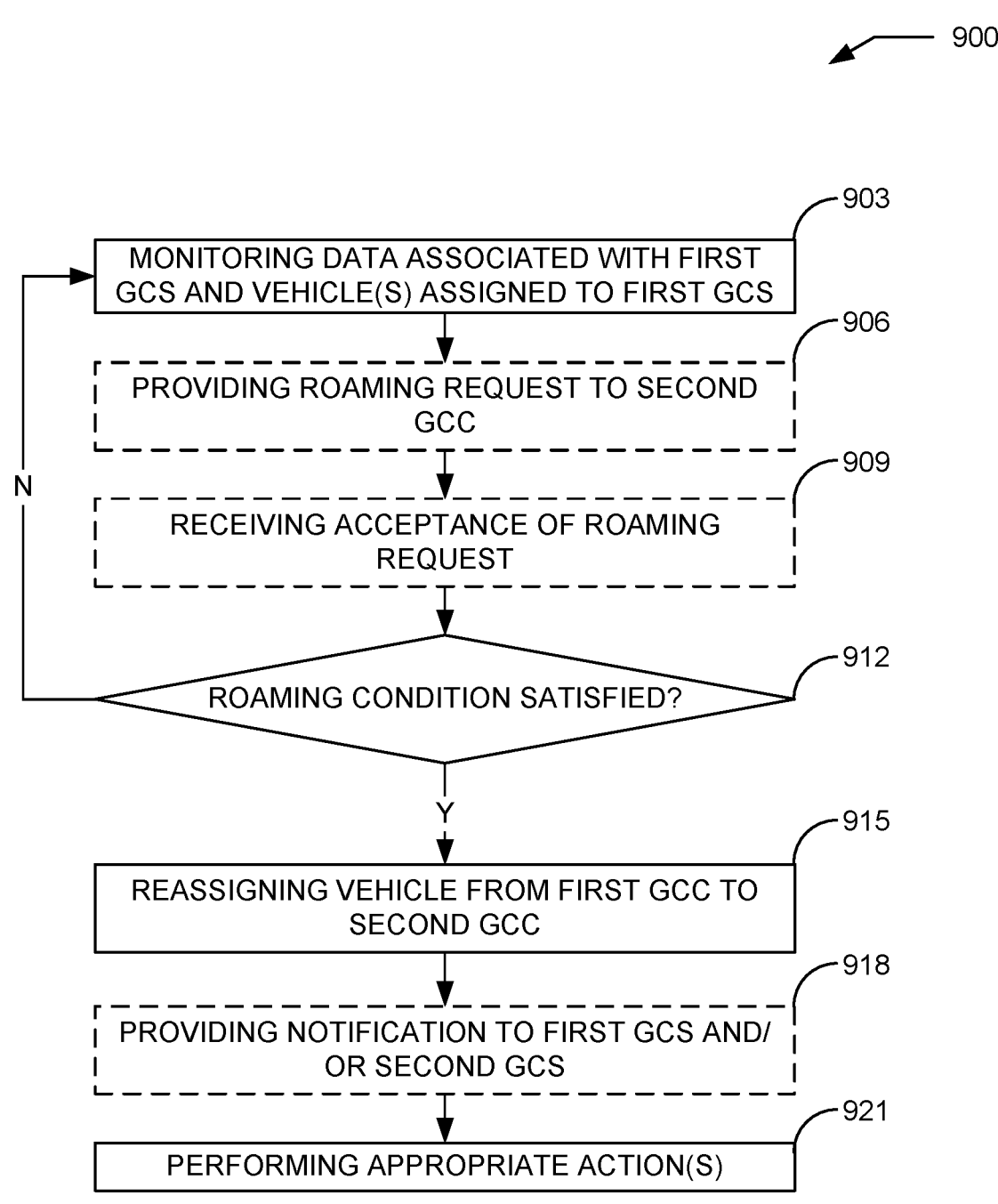

FIG. 9 illustrates a flowchart depicting operations of an example process for vehicle roaming using ground control centers (GCCs) in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Embodiments of the present disclosure provide a myriad of technical advantages in the technical field of unmanned vehicle management. Previous approaches to airspace control and air traffic management may rely upon communication between grounded controllers and human pilots aboard aircraft. However, such approaches are unsuitable for managing airspace and air traffic in the context of UAVs. For example, in some contexts, UAVs are autonomously flown and navigated such that traditional air traffic control infrastructure may be unable to communicate with and direct UAVs by traditional techniques (e.g., high frequency (HF) or very high frequency (VHF) radio calls, controller pilot data link communications (CPDLC), satellite communications (SATCOM), and/or the like). Instead, mission control of an unmanned aerial vehicle (UAV) may be assigned to a ground control station (GCS) such that a ground operator entity may monitor and control movement of the UAV.

However, such techniques for ground-based management of UAVs may require new solutions for complying with airspace and air traffic regulations and for handling off-nominal events at the UAV, GCS, GCC, or ground operator entity. For example, a GCS may experience hardware and/or software failure, which may disable monitoring and control capabilities for a cluster of UAVs assigned to the vehicle. As another example, a ground operator entity of a GCS may experience an excess workload, which reduces a capacity of the ground operator to safely and efficiently monitor all assigned UAVs simultaneously. In still another example, a ground control center (GCC) that includes a plurality of GCSs, each responsible for a set of UAVs, may experience a hardware failure, software failure, or emergency event that results in total loss of communication and control between the GCC and the various sets of UAVs. In these scenarios, an ability to automatically and dynamically reassign mission control for UAVs between GCSs and GCCs may be appropriate to avoid adverse events (e.g., UAV crash, loss of cargo, mission inefficiency, and/or the like). In various embodiments, the present disclosure provides improved techniques for addressing the above technical challenges by performing automated, dynamic handover and roaming of unmanned vehicles between GCSs and/or GCCs.

Some embodiments automatically handover mission control of unmanned vehicles dynamically in real-time from one GCS to another GCS. Some embodiments automatically perform mission handover is response to various factors or contexts, such as requests from a GCS operating entity, detection of high workload at a GCS, detection of system load and/or resource imbalance amongst GCSs, detection of off-nominal activity and/or emergencies at a GCS or GCS operating entity, and/or the like. Some embodiments automatically transfer (e.g., "roam") mission control of unmanned vehicles dynamically in real-time from a GCS of a first ground control center (GCC) to a GCS of a second GCC. Such embodiments may maintain data at a GCC level, such that the first GCC maintains data utilized by the first GCS to the second GCC to enable transfer of control from the first GCS to any GCS, or between GCSs, of the second GCC. Some embodiments automatically perform mission roaming is response to various factors or contexts, such as predefined location conditions, detection of off-nominal activity and/or emergencies at a GCS or GCC, and/or the like. Such processes and techniques may improve safety and efficiency of controlling mission handover and roaming of unmanned vehicle fleets while overcoming challenges of previous approaches to adequately support missions involving remotely-piloted vehicles.

In a mission handover context, some embodiments cause rendering of a ground control interface on a ground control station associated with a ground control center, the ground control center being associated with a master control system connected to the ground control station. In some contexts, the ground control station is assigned a plurality of vehicles from a set of vehicles to enable control of each vehicle in the plurality of vehicles. In some contexts, each vehicle of the set of vehicles is associated with one of a plurality of flight mission data objects stored via the master control system of the first ground control center. In some contexts, the ground control interface includes flight control data indicative of a subset of the plurality of flight mission data objects corresponding to the plurality of vehicles assigned to the first ground control station. Some embodiments receive a control change indication from the ground control station or the master control station of the first ground control center, the control change indication indicative of reassignment of a subset of the plurality of vehicles. Some embodiments, reassign, in real-time from receiving the control change indication, the subset of the first plurality of vehicles from the first ground control station to the second ground control station associated with the ground control center. In some contexts, reassignment of the subset of the plurality of vehicles to the second ground control station enables the second ground control station to newly access data corresponding to the subset of the plurality of vehicles via the master control system to enable control of the subset of the plurality of vehicles.

In a mission roaming context, some embodiments receive a location for a vehicle and/or each of a plurality of vehicles assigned to a GCS of a first GCC. In some contexts, each vehicle is associated with one of a plurality of flight mission data objects stored via a master control system of the first GCC. Some embodiments detect an indication of off-nominal activity or an emergency event at the first GCC, or otherwise indicate initiation of a roaming event. Some embodiments reassign, in real-time from detecting any such indication, the particular vehicle from the first GCC to the second GCC by copying or otherwise transferring the data corresponding to the particular vehicle (or the plurality of vehicles) from the master control system of the first ground control center to a second master control system of the second GCC to enable such data to be utilized to control the particular vehicle (or the plurality of vehicles) via a GCS of the second GCC. In some contexts, control is then assigned to a particular GCS of the second GCC and/or may be freely transferred via handover between any of the GCSs of the second GCC.

Definitions

"Vehicle" refers to any apparatus that traverses throughout an environment by any mean of travel. In some contexts, a vehicle transports goods, persons, and/or the like, or traverses itself throughout an environment for any other purpose, by means of air, sea, or land. In some embodiments, the vehicle is remotely controllable such that a remote operator may initiate and direct movement of the vehicle. In some embodiments, a vehicle is ground-based, air-based, water-based, space-based (e.g., outer space or within an orbit of a planetary body, a natural satellite, or artificial satellite), and/or the like. In some embodiments, the vehicle is an aerial vehicle capable of air travel. Non-limiting examples of aerial vehicles include urban air mobility vehicles, drones, helicopters, fully autonomous air vehicles, semi-autonomous air vehicles, airplanes, orbital craft, spacecraft, and/or the like. In some embodiments, the vehicle is unmanned. For example, the vehicle may be a powered, aerial vehicle that does not carry a human operator and is piloted by a remote operator using a ground control station. In some embodiments, the vehicle is an aquatic vehicle capable of surface or subsurface travel through and/or atop a liquid medium (e.g., water, water-ammonia solution, other water mixtures, and/or the like). Non-limiting examples of aquatic vehicles include unmanned underwater vehicles (UUVs), surface watercraft (e.g., boats, jet skis, and/or the like), amphibious watercraft, hovercraft, hydrofoil craft, and/or the like. As used herein, vehicle may refer to vehicles associated with UAM.

"UAM" refers to urban air mobility, which includes all aerial vehicles and functions for aerial vehicles that are capable of performing vertical takeoff and/or vertical landing procedures. Non-limiting examples of UAM aerial vehicles include passenger transport vehicles, cargo transport vehicles, small package delivery vehicles, unmanned aerial system services, autonomous drone vehicles, and ground-piloted drone vehicles, where any such vehicle is capable of performing vertical takeoff and/or vertical landing.

"Vehicle cluster" refers to a set of vehicles tasked with and/or utilized for performing one or more missions, where the set of vehicles may include any number of vehicles. For example, a vehicle cluster may include a single vehicle or multiple vehicles utilized for transporting one or more payloads from a first location to a second location. In some embodiments, all vehicles of the vehicle cluster are associated with the same mission. For example, a vehicle cluster may include three vehicles where each vehicle is associated with a mission of transporting cargo from a first destination to a second destination (e.g., via the same travel pathway or different travel pathways). In other embodiments, subsets of a vehicle cluster are associated with different missions. For example, a vehicle cluster may include a first subset of vehicles associated with a tactical observation mission for a location and a second subset of vehicles associated with a payload delivery mission for the location.

"Ground control station" (GCS) refers to any number of computing device(s) and/or other system(s) embodied in hardware, software, firmware, and/or the like that control, operate, receive and maintain data respective to, and/or monitor one or more vehicles. For example, a GCS may include or embody a computing terminal by which one or more vehicles are remotely operated. In some embodiments, the GCS includes one or more displays by which data corresponding to one or more vehicles and/or missions is displayed to a GCS operating entity. In some embodiments, the GCS includes one or more input devices by which instructions or commands for controlling vehicles are received by the GCS via user input provided to the input device by a GCS operating entity.

"Ground control center" (GCC) refers to any number of computing device(s) and/or other system(s) embodied in hardware, software, firmware, and/or the like that control, operate, receive and maintain data respective to, and/or monitor GCSs and vehicles assigned to GCSs. For example, a GCC may include or embody a facility including multiple GCSs, network infrastructure for communicating with and controlling the GCSs, and connectivity to additional GCCs, navigation and tracking services, air traffic or airspace management services, or other external systems and services. In some embodiments, a GCC includes one or more input devices for receiving instructions or commands from a GCC operating entity for controlling the GCC and/or GCSs or vehicles associated with the GCC. In some embodiments, a GCC includes one or more displays devices for displaying to a GCC operating entity data corresponding to the GCC, one or more GCSs associated with the GCC, and/or one or more vehicles associated with the GCC.

"Master control apparatus" refers to any number of computing device(s) and/or other system(s) embodied in hardware, software, firmware, and/or the like that control, operate, receive and maintain data respective to, and/or monitor GCCs and vehicles assigned to GCCs or GCSs associated with the GCCs. For example, a master control apparatus may maintain data for controlling and monitoring a plurality of vehicles. The master control apparatus may further maintain and control assignments of vehicles to GCCs and/or GCSs, where assignment enables the GCC and/or GCS to access the corresponding data for controlling and monitoring the assigned vehicle. In some embodiments, "master control system" is used interchangeably with master control apparatus. In some embodiments, the master control apparatus includes one or more executable functions that embody a GCC and one or more GCSs. For example, the master control apparatus may be a computing system including functions that, upon execution by the computing system, embody a GCC, one or more GCSs, and functions described as being performed by a GCC or GCS as described herein.

"Operating entity" refers to a human and/or automated computing entity that, via input of instructions and/or commands, controls operation of one or more vehicle and/or one or more systems related to establishing a connection with the vehicle, monitoring the vehicle, and/or managing assignment of control of the vehicle. For example, an operating entity may be a human and/or automated computing entity that, via input of instructions and/or commands, controls operation of one or more vehicles via a ground control station (GCS) of a ground control center (GCC). In another example, an operating entity may be a human and/or automated computing entity that, via input of instructions and/or commands, controls operation of a GCC and a plurality of GCSs associated with the GCC. In another example, the operating entity may be a human and/or automated computing entity that, via input of instructions and/or commands, controls operation a master control apparatus. In various embodiments, an automated computing entity may embody the GCS, GCC, or master control apparatus, such as by embodying specially-configured computing resources and functions for UAM control.

"Off-nominal event" and "off-nominal activity" refer to any events or activities associated with deviation from an expected or ideal condition, behavior, procession, and/or the like. For example, in at least a vehicle navigation context, off-nominal activity may include deviation of a vehicle from a predefined travel pathway. In another example, off-nominal activity may include a vehicle demonstrating an unstable movement pattern, such as flight instability. In another example, an off-nominal event may include a delay or threshold-exceeding latency in communication between a GCS and a vehicle. In another example, an off-nominal event may be a collision or near-collision of two or more vehicles. In another example, an off-nominal event may be a partial or total loss of a vehicle payload. In another example, off-nominal activity may include impaired performance by an operating entity, such as a GCS operating entity. In still another example, an off-nominal event includes a fault at a GCS.

"Fault" refers to refers to any deviation in expected and/or or programmed performance of hardware, software, firmware, and/or the like. For example, a fault may be a loss of processing functionality in software. As another example, fault may be a hardware failure. In still another example, a fault may be a firmware error embodied as a memory error.

"Emergency" refers to a condition, event, activity, and/or the like that affects or pose a risk of affecting health, life, physical property, digital property, environment, and/or the like. An emergency may include ongoing, previous, or imminent conditions, events, activities, and/or the like. In one example, an emergency may be a fire or flood at a GCS or GCC. In another example, an emergency may include incapacitation of one or more operating entities, such as one or more GCS operating entities. In another example, an emergency may be a total loss of power and/or network connectivity at a GCC. In still another example, an emergency may be an explosive blast, electromagnetic field event (e.g., nuclear detonation, solar flare, and/or the like).

"Geozone" refers to any physical area. In some embodiments, a geozone is a statically-defined physical area, such as an airspace, country boundaries or other political or economic territory boundaries, a natural geographic region (e.g., bodies of water, islands, river basins, peninsulas, and/or the like), or a location of infrastructure (e.g., a ground control center, warehouse, airport or other transportation hub, customs processing center, port of entry, and/or the like). In some embodiments, a geozone is a dynamically-defined physical area that may increase or decrease in dimension and/or change location. For example, a geozone may be a region around a ground control center (GCC) in which dimensions of the region are based on radio communication availability or nominal signal strength between the GCC and one or more vehicles controlled by the GCC. In another example, a geozone may be a predetermined region around a cargo ship or other mobile watercraft. In another example, a geozone may be a predetermined region around a ground-based and/or air-based vehicle.

Example Systems and Apparatuses of the Disclosure

FIG. 1 illustrates a block diagram of a networked environment that may be specially configured within which embodiments of the present disclosure may operate. Specifically, FIG. 1 depicts an example networked environment 100. As illustrated, the networked environment 100 includes a first ground control center (GCC) 103A, a second GCC 103B, a first ground control station (GCS) 105A, a second GCS 105B, and one or more vehicle clusters, such as a vehicle cluster 107A, and a vehicle cluster 107B. In various embodiments, the networked environment 100 includes one or more master control apparatuses 200 that control and monitor functionality and activity of GCCs and GCSs. For example, a master control apparatus ("apparatus") 200 may control the GCC 103A and a plurality of GCSs associated with the GCC 103A such that the apparatus 200 may assign and reassign vehicles, vehicle clusters, corresponding missions, and/or the like, to and from GCSs of the GCC 103A.

In some contexts, such as a vehicle handover context, the networked environment 100 may include an apparatus 200, the first GCC 103A and the first and second GCSs 105A, 105B, where the first and second GCSs 105A, 105B may be associated with (e.g., located at and/or in communication with) the first GCC 103A. In another context, such as a vehicle roaming context, the networked environment 100 may include the first GCC 103A, a first apparatus 200 that controls the first GCC 103A, the second GCC 103B, a second apparatus 200 that controls the second GCC 103B, the first GCS 105A, the second GCS 105B, and one or more vehicle clusters. In such a context, the first GCS 105A may be located at and/or in communication with the first GCC 103A and the second GCS 105B may be located at and/or in communication with the second GCC 103B.

It will be understood and appreciated that the proceeding descriptions of the various elements of the GCC 103A may apply to the GCC 103B. In some embodiments, the GCC 103A includes any number of computing device(s) and/or other system(s) embodied in hardware, software, firmware, and/or the like that control, operate, receive and maintain data respective to, and/or monitor GCSs. In one example, a GCC 103A includes a facility including multiple GCSs and network infrastructure and connectivity to external control centers, cloud servers, and other ground services. In some embodiments, the GCC 103A embodies a system including multiple GCSs and associated master services (e.g., navigation services, tactical mission data services, air traffic data services, weather services, and/or the like) and centralized connectivity to the multiple GCSs. For example, in some contexts, the GCC 103A may include a common server with a network interface to the Internet (e.g., and/or other networks 118) and an airspace-controlling entity, such as unmanned aircraft system traffic management (UTM) or a U-space service provider (USSP). In some embodiments, the GCC 103A or GCC 103B (e.g., and associated GCSs) are located on a moving vessel, such as an aircraft, watercraft, spacecraft, and/or the. In one example, the GCC 103A may be land-based, such as in a standalone facility, and the GCC 103B may be water-based, such as on a cargo vessel, offshore platform, and/or the like.

In some embodiments, the GCC 103A includes a processing element 104 that performs various functions and actions related to enacting techniques and processes described herein for managing GCSs, vehicle clusters, and/or the like, including vehicle handover and vehicle roaming. In some embodiments, the processing element 104 includes one or more circuitries (e.g., physical, virtual, and/or the like) that intake and process data from other computing devices and systems including GCSs, one or more master control apparatuses, vehicles and/or vehicle clusters, geolocation systems or services, weather monitoring systems, transportation and/or cargo logistics systems, and systems associated with airspace-controlling entities (e.g., air traffic systems, emergency alert systems, and/or the like). In some embodiments, the processing element 104 includes one or more circuitries or interfaces that communicate with GCSs, other GCCs, vehicles or vehicle clusters, master control apparatuses, and/or the like. For example, the processing element 104 may include a communication interface that enables communication between the GCC 103A and GCSs associated with the GCC 103A (e.g., including enabling communication between GCS operating entities and a GCC operating entity). In another example, the processing element 104 may include a communication interface that enables communication between a GCC operating entity and a master control operating entity associated with a master control apparatus 200. In some embodiments, the processing element 104 includes GCS control circuitry that enables the GCC 103A to monitor and control GCSs, including causing rendering of ground control interfaces at the GCSs, determining statuses of GCSs (e.g., nominal or off-nominal activity, emergencies, GCS operating entity conditions, and/or like), receiving user input from GCSs, and providing notifications to GCSs, determining availability of GCSs to receive assignments of vehicles, vehicle clusters, missions, and/or the like. In some embodiments, the processing element 104 includes input/output circuitry that enables a GCC operating entity to provide input to and receive output from the GCC 103A. For example, the input/output circuitry may include or embody user interfaces, input devices, and/or the like for receiving input from and providing output to a GCC operating entity.

In some embodiments, the GCC 103A is associated with a master control apparatus 200 (also referred to as a master control system) that includes hardware and software for controlling the GCC 103A and associated GCSs. For example, in a handover context, the master control apparatus 200 of the GCC 103A may include software and hardware that enables an operator entity of the master control apparatus 200 (e.g., a human, autonomous computing entity, and/or the like) to control the GCS 105A and GCS 105B. In some embodiments, the GCC 103A manages a fleet of unmanned vehicles, which may include one or more vehicle clusters. For example, the GCC 103A may manage a fleet of 10, 20, 30, or any suitable number of UAM vehicles, where the fleet of UAM vehicles may be divided into vehicle clusters assigned to different GCSs of the GCC 103A. It will be understood and appreciated that each of the first GCC 103A and the second GCC 103B may include additional GCSs. For example, the first GCC 103A and the second GCC 103B may each include 4, 6, 10, or any suitable number of GCSs, where each GCS is assigned to and manages a mission of one or more vehicles clusters.

In some embodiments, the GCC 103A is associated with one or more constraints that define an operational area and/or responsible territory of the GCC. In some embodiments, the one or more constraints include a geozone including one or more geographical constraints and/or artificial boundaries For example, the constraints may include an airspace-controlling entity-defined region (e.g., UTM sector, U-space sector, and/or the like), a natural area (e.g., river basin, natural harbor, lake, mountain range, forest, island, and/or the like) a regional border (e.g., state border, province border, principality border, and/or the like), a territorial water, an internal water, a contiguous zone, an extended continental shelf, an exclusive economic zone (EEZ), a country border, a city area, or another regional self-governing unit, and/or the like. In some embodiments, the one or more constraints include a transportation constraint including visual line of sight (VLOS) for take-off/landing support, distance to travel, time to travel, fuel or battery expenditure to travel, and/or the like. In some embodiments, the one or more constraints include a role-based constraint, such as commercial shipping and logistics, emergency services, military services, aerial observation services, entertainment services, and/or the like.

In some embodiments, the GCC 103A includes one or more data stores 102 that store data associated with the operation of the various applications, apparatuses, and/or functional entities described herein. In some embodiments, subsets of the various data stored at the data store 102 is accessible to GCSs, potentially dependent upon assignment of a vehicle, vehicle cluster, and/or mission to a GCS, which may result in the GCS being provided access to mission- and/or vehicle cluster-associated data at the data store 102. In some embodiments, data stored at the data store 102 includes master control data 106 including vehicle cluster data 108, mission data 110, GCS data 112, and operator entity data 114. In some embodiments, subsets of the master control data 106 are associated with particular vehicles, vehicle clusters, missions, and/or the like. In various embodiments, such subsets are referred to as mission data objects. In some embodiments, reassignment of a vehicle, vehicle cluster, mission, and/or the like from a first GCS to a second GCS includes providing the second GCS access to one or more mission data objects associated with the vehicle, vehicle cluster, mission, and/or the like being reassigned. In some embodiments, the apparatus 200 provides a GCS with access to a mission data object by associating an identifier of the GCS with the mission data object (or mission data, vehicle cluster data, and/or the like indicative of the mission data object) and/or by copying the mission data object (or mission data, vehicle data, and/or the like indicative thereof) to a GCC associated with the GCS.

In some embodiments, the vehicle cluster data 108 includes data that enables monitoring and control of the vehicle cluster (or an individual vehicle) by the GCC 103A, master control apparatus 200, and GCS to which the vehicle cluster is assigned. In some embodiments, the vehicle cluster data 108 includes one or more vehicle identifiers including serial numbers, equipment identifiers, and/or the like that uniquely identify a vehicle and/or enable tracking and/or control of the vehicle. In one example, the vehicle cluster data 108 may include information that enables communication with the vehicle including a cellular identifier, radio identifier, satellite identifier, and/or the like. In another example, the vehicle cluster data 108 may include a transponder identifier for tracking a location of the vehicle cluster or individual vehicle. In some embodiments, the vehicle cluster data 108 includes properties of one or more vehicles including power supply type, power supply capacity, travel range, control range, maximum altitude, payload capacity, maximum speed, and/or the like. In some embodiments, the vehicle cluster data 108 indicates a number of vehicles in the associated vehicle cluster.

In some embodiments, the mission data 110 includes data indicative of vehicle missions. In some embodiments, a vehicle mission is embodied in the mission data 110 as a mission data object. For example, a mission data object may include a subset of mission data 110 associated with a particular mission and vehicles assigned to perform the particular mission. In some embodiments, the mission data 110 includes a travel path including an origin location, a destination location, and one or more routes between the origin location and the destination location, where an associated vehicle cluster may navigate to from the origin location to the destination location along the route. In some embodiments, the mission data 110 includes one or more waypoint locations, such as power resupply locations, payload pickup or drop-off locations, and/or the like. In some embodiments, the mission data 110 includes data indicative of GCCs along a travel path. For example, the mission data 110 may identify one or more GCCs responsible for monitoring and controlling a vehicle cluster along the travel path or portion thereof. In some embodiments, the mission data 110 includes mission types, such as cargo transportation, package delivery, passenger transit, mapping, and/or the like. In some embodiments, the mission data 110 includes mission criticality levels that indicate an importance or sensitivity of a mission. For example, a mapping mission may be associated with a lowest level of criticality, a cargo transportation or package delivery mission may be associated with a medium level of criticality, and a passenger transit or air-taxi mission may be associated with a highest level of criticality.

In some embodiments, the mission data 110 includes one or more conditions for initiating handover of a vehicle cluster or subset of a vehicle cluster. For example, the mission data 110 may define conditions of nominal and off-nominal activity such that the apparatus 200, GCC 103A, or a GCS may detect off-nominal activity at the vehicle cluster or GCS to which the vehicle cluster is assigned. In another example, the mission data 110 may include predetermined workload thresholds (e.g., numbers of vehicles, mission complexity or criticality, and/or the like) for controlling assignment (and reassignment) of the associated vehicle cluster to and from GCSs. In some embodiments, the mission data 110 includes one or more conditions for roaming a vehicle cluster or subset of a vehicle cluster. In some embodiments, the mission data 110 includes one or more conditions for initiating roaming a vehicle cluster or subset of a vehicle cluster. For example, the mission data 110 may define conditions for initiating roaming based on proximity of a location of a vehicle cluster to a GCC, destination location, origin location, or natural or artificial boundary or border. In another example, the mission data 110 may define conditions for initiating roaming based on off-nominal activity or an emergency at a GCC to which a vehicle cluster is currently assigned.

In some embodiments, the GCS data 112 includes data that identifies and describes one or more GCSs including GCS workloads and statuses. For example, the GCS data 112 may include data that identifies and describes the GCS 105A and GCS 105B. In some embodiments, the GCS data 112 includes or is associated with an identifier for a GCS. For example, the GCS data 112 may include respective application server addresses for each of the GCS 105A and GCS 105B. In another example, the GCS data 112 includes a numerical or alphanumerical identifier for each GCS of a GCC. In some embodiments, the GCS data 112 includes a current workload for one or more GCSs. In some embodiments, the workload refers to a number of vehicles currently assigned to a GCS, a number of vehicle clusters currently assigned to the GCS, a number of vehicles in a vehicle cluster currently assigned to the GCS, a complexity level of one or more missions associated with vehicles currently assigned to the GCS, and/or the like. In some embodiments, the GCS data 112 includes one or more statuses that indicate an availability of a GCS to receive an assignment of a vehicle, vehicle cluster, mission, and/or the like. In some embodiments, such statuses of availability include online busy, nominal activity in managing currently assigned vehicles, off-nominal activity in managing currently assigned vehicles, and/or the like. In one example, the apparatus 200 may determine that a GCS associated with an online or nominal activity status is available to receive reassignment of a vehicle, vehicle cluster, mission, and/or the like, such as in performance of a handover process or roaming process to reassign vehicles between GCSs at the same GCC or between GCSs at different GCCs.

In some embodiments, the GCS data 112 includes software information, hardware information, firmware information, and/or the like, associated with the GCS such that the data may be used to monitor the GCS and detect faults in GCS software, hardware, firmware, and/or the like. For example, the GCS data 112 may include thresholds and/or current values for GCS hardware including central processing unit (CPU) speed, graphics processing unit (GPU) speed, random access time, disk time, latency time, seek time, data transfer rate, and/or the like. In another example, the GCS data 112 may include thresholds and/or current values for GCS software including CPU usage, memory usage, disk usage, GPU usage, and/or the like. In some embodiments, the GCS data 112 includes error codes and/or the like for detecting and identifying fault states in GCS software, firmware, hardware, and/or the like. In some embodiments, the GCS data 112 includes a power availability status indicative of whether a GCS is experiencing or has experienced a loss of power. In some embodiments, the GCS data 112 includes a communication availability status indicative of whether a GCS is experiencing or has experienced a loss of communication functionality.

In some embodiments, the GCS data 112 includes historical inputs to a GCS, which may be processed by the apparatus 200 or associated GCS to determine nominal or off-nominal performance of the GCS or GCS operating entity. For example, the GCS data 112 may include historical inputs for vehicle control, handover requests, roaming requests, and/or the like. In another example, the GCS data 112 may include metadata for inputs, such as input time-stamps, response times, cursor or input device tracking data, and/or the like. In some embodiments, the GCS data 112 includes environment data associated the GCS including external temperature, internal hardware temperature, humidity, and/or the like.

In some embodiments, the operating entity data 114 includes data associated with GCS operating entities, GCC operating entities, master control operating entities, and/or the like. In some embodiments, the operating entity data 114 includes biological signal data and thresholds by which a nominal, off-nominal, or emergency condition of an operating entity may be detected. For example, the operating entity data 114 may include a heart rate, respiratory rate, pulse oximetry data, motor control or dexterity data (e.g., reaction time, precision or accuracy of user inputs, and/or the like), metrics for estimating fatigue (e.g., hours worked, tracked rest, and/or the like), eye tracking data, and/or the like. In some embodiments, the operating entity data 114 includes operating entity identifiers. For example, the operating entity data 114 includes a numerical, alphanumerical, or alphabetic identifier that uniquely identifiers an operating entity. In some embodiments, the operating entity data 114 includes data indicative of associations between operating entities, GCSs, and/or GCCs such that the apparatus 200 may identify a GCS and/or GCC to which an operating entity is assigned. Further example aspects and architecture of the master control data 106 are described herein with reference to the data architecture 300 depicted in FIG. 3.

It will be understood and appreciated that the proceeding descriptions of the various elements of the GCS 105A may apply to the GCS 105B. In some embodiments, the GCS 105A includes any number of computing device(s) and/or other system(s) embodied in hardware, software, firmware, and/or the like that control, operate, receive and maintain data respective to, and/or monitor one or more vehicle clusters, or a subset of vehicles of a vehicle cluster. For example, the first GCS 105A may monitor and control a vehicle cluster 107A. In some embodiments, control of a vehicle cluster refers to management of and responsibility for a mission associated with and to be performed using the vehicle cluster. In some embodiments, a vehicle cluster 107A or 107B includes any number of unmanned vehicles. For example, a vehicle cluster 107A may include 3, 7, 10, or any number of unmanned aerial vehicles (UAVs) that are controlled by the GCS 105A. In some embodiments, a vehicle cluster 107A or 107B is associated with a mission, such as cargo transportation, package delivery, passenger transit, mapping, and/or the like. In some embodiments, each GCS of a GCC 103A or 103B is assigned to one or multiple vehicle clusters, where each vehicle cluster and each vehicle within a vehicle cluster may be associated with the same or a different mission. For example, the GCC 103A may include a first GCS configured to manage a first vehicle cluster and a mission of each vehicle in the first vehicle cluster and a second GCS configured to manage a second vehicle cluster and a mission of each vehicle in the second cluster (e.g., where each mission may be exclusive to an individual vehicle, a subset of vehicles in a vehicle cluster, or all vehicles in the vehicle cluster).

In a particular example, the GCS 105A may be assigned to and manage a mission for each vehicle of a subset of a plurality of vehicles assigned to the GCC 103A. Each vehicle may be associated with a mission, such as via a flight mission data object stored as mission data 110. The GCS 105A may communicate with and control each vehicle via one or more communication interfaces of the GCC 103A that provide a data link between the GCS 105A and each vehicle. The GCS may also communicate with one or more airspace authorities using one or more communication interfaces of the GCC 103A, such as via a voice communication modality (e.g., cellular communication, Internet protocol-based communication, virtual private network-based communication, radio communication, satellite communication, and/or the like).

In some embodiments, the GCS 105A includes one or more displays 115 on which graphical user interfaces (GUIs) and other information related to managing vehicle clusters and missions may be rendered. In some embodiments, the display 115 includes a CRT (cathode ray tube), LCD (liquid crystal display) monitor, LED (light-emitting diode) monitor, and/or the like, for displaying information/data to a GCS operating entity. In one example, the display 115 may include a ground control interface that displays flight control data indicative of a plurality of UAVs assigned to the GCS 105A and mission data 110 (e.g., one or more flight mission data objects) corresponding to the assigned plurality of UAVs. In some embodiments, the GCS 105A includes a first display 115 that displays a ground control interface and one or more secondary displays 115 that display additional information, such as navigational data for assigned vehicles, tactical information for the assigned vehicles and/or associated mission, communication interfaces for communications between the GCS operating entity and a GCC operating entity (e.g., operating entity of the master control apparatus 200), and/or the like.

In some embodiments, the GCS 105A includes one or more input devices 116 for receiving user inputs. For example, the input device 116 may receive commands to control an unmanned vehicle. In another example, the input device 116 may receive a request for reassignment of one or more vehicles to another GCS at a GCC (e.g., handover) or for reassignment of one or more vehicles to a GCS at another GCC (e.g., roaming). In another example, the input device 116 may receive a user input for indicating an excess workload to a master control apparatus of the associated GCC. In still another example, the input device 116 may receive a user input for accepting a request to receive reassignment of one or more vehicles and/or missions from another GCS. In another example, the input device 116 may receive a user input for indicating a workload of the GCS, an emergency, off-nominal activity at the GCS 105A, and/or the like, to a master control apparatus 200. The input device 116 may include any number of devices that enable human-machine interface (HMI) between a GCS operating entity and the GCS, such as interaction of a GCS operating entity with GUIs rendered on the display 115 of the GCS. In some embodiments, the input device 116 include one or more buttons, cursor devices, joysticks, touch screens, including three-dimensional or pressure-based touch screens, camera, finger-print scanners, accelerometer, retinal scanner, gyroscope, magnetometer, or other input devices. In some embodiments, the input device 116 includes one or more vehicle controls (e.g., joysticks, thumbsticks, yokes, steering wheels, accelerator control, thrust control, brake control, and/or the like) that enable a GCS operating entity to remotely control and navigate one or more vehicles.

In some embodiments, the GCSs 105A, 105B and vehicle clusters 107A, 107B are communicable with the GCC 103A and/or GCC 103B. In some embodiments, the GCC 103A, the master control apparatus 200, the GCS 105A, and/or vehicle(s) of the vehicle clusters 107A, 107B are communicable over one or more communications network(s), for example the communications network(s) 118. It should be appreciated that the communications network 118 in some embodiments is embodied in any of a myriad of network configurations. In some embodiments, the communications network 118 embodies a public network (e.g., the Internet). In some embodiments, the communications network 118 embodies a private network (e.g., an internal, localized, and/or closed-off network between particular devices). In some other embodiments, the communications network 118 embodies a hybrid network (e.g., a network enabling internal communications between particular connected devices and external communications with other devices). In some embodiments, the communications network 118 embodies a satellite-based communication network. Additionally, or alternatively, in some embodiments, the communications network 118 embodies a radio-based communication network that enables communication and control between a GCS and one or more unmanned vehicles. The communications network 118 in some embodiments may include one or more base station(s), relay(s), router(s), switch(es), cell tower(s), communications cable(s) and/or associated routing station(s), and/or the like. In some embodiments, the communications network 118 includes one or more user-controlled computing device(s) (e.g., a user owner router and/or modem) and/or one or more external utility devices (e.g., Internet service provider communication tower(s) and/or other device(s)).

Each of the components of the system communicatively coupled to transmit data to and/or receive data from one another over the same or different wireless or wired networks embodying the communications network 118. Such configuration(s) include, without limitation, a wired or wireless Personal Area Network (PAN), Local Area Network (LAN), Metropolitan Area Network (MAN), Wide Area Network (WAN), satellite network, radio network, and/or the like. Additionally, while FIG. 1 illustrate certain system entities as separate, standalone entities communicating over the communications network 118, the various embodiments are not limited to this particular architecture. In other embodiments, one or more computing entities share one or more components, hardware, and/or the like, or otherwise are embodied by a single computing device such that connection(s) between the computing entities are over the communications network 118 are altered and/or rendered unnecessary.

FIG. 2 illustrates a block diagram of an example apparatus that may be specially configured in accordance with at least some example embodiments of the present disclosure; Specifically, FIG. 2 depicts an example master control apparatus 200 ("apparatus 200") specially configured in accordance with at least some example embodiments of the present disclosure. In some embodiments, the GCC 103A or GCC 103B and/or a portion thereof is embodied by one or more system(s), such as the apparatus 200 as depicted and described in FIG. 2. In some embodiments, the apparatus 200 is a master control system that controls a GCC and GCSs of the GCC such that the apparatus 200 is capable of assigning and reassigning unmanned vehicles (and corresponding vehicle missions) to the GCS of the GCC or to another GCC (e.g., which may include additional GCSs). In some embodiments, the apparatus 200 includes a processor 201, memory 203, communications circuitry 205, input/output circuitry 207, GCC control circuitry 209, and GCS control circuitry 211. In some embodiments, the apparatus 200 is configured, using one or more of the processor 201, memory 203, communications circuitry 205, input/output circuitry 207, GCC control circuitry 209, and/or GCS control circuitry 211, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, modifying, restoring, processing, displaying, storing, determining, creating/generating, monitoring, evaluating, comparing, and/or similar terms used herein interchangeably. In one embodiment, these functions, operations, and/or processes may be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Additionally, or alternatively, in some embodiments, other elements of the apparatus 200 provide or supplement the functionality of another particular set of circuitry. For example, the processor 201 in some embodiments provides processing functionality to any of the sets of circuitry, the memory 203 provides storage functionality to any of the sets of circuitry, the communications circuitry 205 provides network interface functionality to any of the sets of circuitry, and/or the like.

In some embodiments, the processor 201 (and/or co-processor or any other processing circuitry assisting or otherwise associated with the processor) is/are in communication with the memory 203 via a bus for passing information among components of the apparatus 200. In some embodiments, for example, the memory 203 is non-transitory and may include, for example, one or more volatile and/or non-volatile memories. In other words, for example, the memory 203 in some embodiments includes or embodies an electronic storage device (e.g., a computer readable storage medium). In some embodiments, the memory 203 is configured to store information, data, content, applications, instructions, or the like, for enabling the apparatus 200 to carry out various functions in accordance with example embodiments of the present disclosure (e.g., automated, dynamical vehicle mission handover and/or vehicle mission roaming). In some embodiments, the memory 203 is embodied as, or communicates with, a data store 102 as shown in FIG. 1 and described herein. In some embodiments, the memory 203 includes master control data 106 including vehicle cluster data 108, mission data 110, GCS data 112, operator entity data 114, and/or the like, as further architected in FIG. 3 and described herein.

The processor 201 may be embodied in a number of different ways. For example, in some example embodiments, the processor 201 includes one or more processing devices configured to perform independently. Additionally, or alternatively, in some embodiments, the processor 201 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 201 is configured to execute instructions stored in the memory 203 or otherwise accessible to the processor. Additionally, or alternatively, the processor 201 in some embodiments is configured to execute hard-coded functionality. As such, whether configured by hardware or software methods, or by a combination thereof, the processor 201 represents an entity (e.g., physically embodied in circuitry) capable of performing operations according to an embodiment of the present disclosure while configured accordingly. Additionally, or alternatively, as another example in some example embodiments, when the processor 201 is embodied as an executor of software instructions, the instructions specifically configure the processor 201 to perform the algorithms embodied in the specific operations described herein when such instructions are executed.

As one particular example embodiment, the processor 201 is configured to perform various operations associated with controlling and monitoring unmanned vehicles and association missions, including handover of vehicle control and roaming of vehicle control as further described herein. In some embodiments, the processor 201 includes hardware, software, firmware, and/or the like, that causes rendering of ground control interfaces at ground control stations (GCSs), assigns vehicles and associated missions to GCSs (or vice versa), reassigns vehicles and associated missions between GCSs (e.g., from a first GCS to one or more second GCSs), receives control change indications, generates control change indications, and monitors activities at and statuses of the ground control station (GCC), GCSs of the GCC, and ground operating entities thereof (e.g., which may be utilized by the processor 201 to receive or generate control change indications and initiate actions in response). For example, the processor 201 may assign a plurality of vehicles to a ground control station such that the apparatus 200 enables the ground control station to newly access data corresponding to the plurality of vehicles to enable the ground control station to control and monitor the plurality of vehicles (e.g., in management and support of a vehicle mission, such as cargo transportation, package delivery, passenger transit, mapping, and/or the like). In another example, the processor 201 of a first apparatus 200 connected to a first GCC may reassign a vehicle from the first GCC (e.g., and a first GCS at the first GCC) to a second GCC (e.g., and a second GCS at the second GCC) by copying data to a second apparatus 200 connected to the second GCC such that the second GCS at the second GCC is able to newly access the copied data to enable control and monitoring of the vehicle.

In another example, the processor 201 may receive a control change indication associated with a GCS of a GCC and one or more vehicles assigned to the GCS. In another example, the processor 201 may receive a location of a vehicle and determine (or receive an indication) that the location is beyond a first geozone of a first GCC or within a threshold distance of a second GCC. In still another example, the processor 201 may receive an indication of (or detect) one or more faults at a GCS, such as a software failure, hardware failure, and/or the like.

In some embodiments, the apparatus 200 includes input/output circuitry 207 that provides output to the user (e.g., a master control operating entity, GCC operating entity, or GCS operating entity) and, in some embodiments, to receive an indication of a user input. For example, in some contexts, the input/output circuitry 207 provides output to and receives input from one or more GCCs 103A, 103B or GCSs 105A, 105B. In some embodiments, the input/output circuitry 207 is in communication with the processor 201 to provide such functionality. The input/output circuitry 207 may comprise one or more user interface(s) and in some embodiments includes a display that comprises the interface(s) rendered as a web user interface, an application user interface, a user device, a backend system, or the like. In some embodiments, the input/output circuitry 207 also includes a keyboard, a mouse, a joystick, a touch screen, touch areas, soft keys a microphone, a speaker, and/or other input/output mechanisms. The processor 201 and/or input/output circuitry 207 comprising the processor may be configured to control one or more functions of one or more user interface elements through computer program instructions (e.g., software and/or firmware) stored on a memory accessible to the processor 201 (e.g., memory 203, data store 102, and/or the like). In some embodiments, the input/output circuitry 207 includes or utilizes a user-facing application to provide input/output functionality to a display of a GCS, display of a GCC, and/or other display associated with a user.

In some embodiments, the apparatus 200 includes communications circuitry 205. The communications circuitry 205 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 205 includes, for example, a network interface for enabling communications with a wired or wireless communications network, such as the network 118 shown in FIG. 1 and described herein. Additionally, or alternatively in some embodiments, the communications circuitry 205 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 205 includes circuitry for interacting with the antenna(s) and/or other hardware or software to cause transmission of signals via the antenna(s) or to handle receipt of signals received via the antenna(s). In some embodiments, the communications circuitry 205 enables transmission to and/or receipt of data from data stores 102, GCC 103A, GCC 103B (or an apparatus 200 that controls the GCC 103B), GCS 105A, GCS 105B, vehicle clusters 107A, 107B (e.g., or individual vehicles thereof, including connected vehicle systems, such as flight control systems, sensor systems, geolocation systems, and/or the like), and/or other external computing devices in communication with the apparatus 200.

The GCC control circuitry 209 includes hardware, software, firmware, and/or a combination thereof, that supports managing a GCC. For example, in some contexts, the GCC control circuitry 209 includes hardware, software, firmware, and/or the like, that receives or determines statuses of a GCC including network connectivity, primary power, auxiliary or backup power, and environment (e.g., temperature, moisture, fire, vibration, and/or the). In another example, in some embodiments, the GCC control circuitry 209 receives an indication of (or detects) whether the GCC is experiencing off-nominal activity (e.g., software failure, hardware failure, loss of network connectivity, loss of power, and/or the like), an emergency (e.g., fire, flood, earthquake, high winds, biological threat, shooter threat, equipment or facility overheat, construction breakdown, electromagnetic field anomaly, bomb blast, cyberattack, and/or the like), or is unreachable (e.g., total loss of power and communication functionality). The GCC control circuitry 209 may communicate with a data store 102, one or more GCSs, and/or sensors to obtain such statuses (or data by which such statuses may be determined). In some embodiments, the GCC control circuitry 209 (potentially with the GCS control circuitry 211 and/or communications circuitry 205) establishes connections between one or more GCSs and a GCC such that the GCC is enabled to access data associated with controlling and monitoring the GCS. In some embodiments, the GCC control circuitry 209 establishes the connection between the GSC and the GCC such that the GCS is enabled to access, via the apparatus 200 and GCC, data corresponding to one or more vehicles, vehicle clusters, missions, and/or the like, assigned to the GCC. In some embodiments, the connection established via the GCC control circuitry 209 enables rendering of ground control interfaces at the GCS, which may include data corresponding to one or more vehicles, vehicle clusters, missions, and/or the like, assigned to the GCS via the apparatus 200 and GCC.

In some embodiments, the GCC control circuitry 209 communicates with additional GCCs, such as via communications circuitry 205 of the apparatus 200 of the GCC and corresponding communications circuitry 205 of a second apparatus 200 at a second GCC. For example, the GCC control circuitry 209 of an apparatus 200 for a first GCC may provide a request to second GCC control circuitry 209 of an apparatus 200 of a second GCC, where the request is for roaming approval including reassignment of one or more vehicles from the first GCC to the second GCC (e.g., by copying data from the apparatus 200 of the first GCC to the apparatus 200 of the second GCC). In some embodiments, GCC control circuitry 209 includes a separate processor, specially configured field programmable gate array (FPGA), and/or a specially programmed application specific integrated circuit (ASIC).

The GCS control circuitry 211 includes hardware, software, firmware, and/or a combination thereof, that supports managing one or more GCSs. For example, in some embodiments, the GCS control circuitry 211 includes hardware, software, firmware, and/or any combination thereof, that receives or determines statuses of a GCS including network connectivity, primary power, backup or auxiliary power, software performance and fault states, hardware performance and fault states, workload (e.g., number of assigned vehicles, number of assigned missions, mission complexity, mission duration, and/or the like), environment (e.g., temperature, humidity, light level, fire presence, electrical anomaly, radiation level), and/or the like. In another example, in some embodiments, the GCS control circuitry 211 includes hardware, software, firmware, and/or the like, that the receives or determines performance indicators for a GCS operating entity including responsiveness, mission error rate, mission efficiency, alertness, heart rate, respiratory rate and other vitals, eye movement, cursor movement, and/or the like. In another example, in some embodiments, the GCS control circuitry 211 receives an indication of (or detects) whether the GCS is experiencing off-nominal activity (e.g., software failure, hardware failure, loss of network connectivity, loss of power, poor operating entity performance, and/or the like), an emergency (e.g., fire, flood, incapacitated or unavailable operating entity, and/or the like), or is unreachable (e.g., total loss of power, communication functionality, GCS operating entity control, and/or the like). The GCS control circuitry 211 may communicate with a data store 102, one or more GCS operating entities, and/or sensors to obtain such statuses (or data by which such statuses may be determined).

In another example, in some embodiments, the GCS control circuitry 211 includes hardware, software, firmware, and/or any combination thereof, that processes user inputs at a GCS including acceptance or rejection of a vehicle or mission assignment, requests to reassign one or more vehicles and/or missions from the GCS to another GCS at the same GCC (e.g., handover), requests to reassign one or more vehicles and/or missions from the GCS to a GCS at a different GCC (e.g., roaming), and/or the like. In another example, in some embodiments, the GCS control circuitry 211 includes hardware, software, firmware, and/or any combination thereof, causes rendering of user interfaces at the GCS including ground control user interfaces, user interfaces including notifications of vehicle and/or mission reassignment, navigational interfaces, tactical vehicle management interfaces, and/or the like. In some embodiments, the GCS control circuitry 211 communicates with a GCS operating entity, such as via the communications circuitry 205 and/or input/output circuitry 207. For example, the GCS control circuitry 211 may prompt a GCS operating entity to indicate whether a current workload at the corresponding GCS requires rebalancing. In another example, the GCS control circuitry 211 may notify the GCS operating entity of reassignment of a vehicle and/or mission to or from the GCS. In some embodiments, the GCS control circuitry 211 includes a separate processor, specially configured field programmable gate array (FPGA), and/or a specially programmed application specific integrated circuit (ASIC).

Additionally, or alternatively, in some embodiments, two or more of the processor 201, memory 203, communications circuitry 205, input/output circuitry 207, GCC control circuitry 209, and/or GCS control circuitry 211 are combinable. Additionally, or alternatively, in some embodiments, one or more of the sets of circuitry perform some or all of the functionality described associated with another component. For example, in some embodiments, two or more of the sets of circuitry 201-211 are combined into a single module embodied in hardware, software, firmware, and/or a combination thereof. Similarly, in some embodiments, one or more of the sets of circuitry, for example the GCC control circuitry 209, and/or the GCS control circuitry 211 is/are combined with the processor 201, such that the processor 201 performs one or more of the operations described above with respect to each of these sets of circuitry 207-211.

Example Data Architectures and Workflows of the Disclosure

Having described example systems and apparatuses in accordance with embodiments of the present disclosure, example architectures of data and workflows in accordance with the present disclosure will now be discussed. In some embodiments, the systems and/or apparatuses described herein maintain data environment(s) that enable the workflows in accordance with the data architectures described herein. For example, in some embodiments, the systems and/or apparatuses described herein function in accordance with the data architectures depicted and described herein with respect to FIG. 3 and the workflows depicted and described herein with respect to FIGS. 4-7 are performed or maintained via the apparatus 200 and, in some embodiments, one or more GCCs 103 and/or GCSs 105.

FIG. 3. illustrates an example data architecture 300 in accordance with at least some example embodiments of the present disclosure. In some embodiments, the data architecture 300 depicts storage and organization of data at a first GCC 103A and first GCSs 310A, 310B controlled by a first master control apparatus ("apparatus") 200A and a second GCC 103B and second GCSs 310C, 310D controlled by a second apparatus 200B. For example, the first GCC 103A may include a data store including master control data 106A and the second GCC 103B may include a data store including master control data 106B.

In some embodiments, master control data includes vehicle cluster data, mission data, GCS data, and operating entity data, where sets of the vehicle cluster data, mission data, GCS, and operating entity data may be associated with and/or assigned to particular GCSs and/or GCS operating entities of a GCC. In one example, the master control data 106A may include a first set of master control data associated with a first GCS 310A and a second set of data associated with a second GCS 310. In some embodiments, the data associated with the first GCS 310A includes vehicle cluster data 108A, mission data 110A, GCS data 112A, and operating entity data 114A. In some embodiments, the vehicle cluster data 108A and/or mission data 110A are embodied as a mission data object 302A that provides a data representation of a vehicle, vehicle cluster, mission, and/or the like. In some embodiments, the master control data includes data associated with a GCC. For example, the master control data 106A may include an identifier for the GCC 103A, a location of the GCC 103A, a workload of the GCC 103A (e.g., which may be based on workloads of GCSs associated with the GCC 103A), conditions of the GCC 103A (e.g., power state, connectivity status, environmental data), and/or the like.

In some embodiments, master control data includes GCS identifiers that define associations between sets of data and a GCS such that the association of a set of data may indicate assignment of the GCS to a vehicle, vehicle cluster, mission, and/or the like. For example, the master control data 106A may include a GCS identifier 301A associated with a first GCS 310A. The apparatus 200A may associate, in the master control data 106A, the GCS identifier 301A with the vehicle cluster data 108A and mission data 110A to indicate assignment of the corresponding GCS 310A to a vehicle cluster and mission with which the vehicle cluster data 108A and mission data 110A are associated. In some embodiments, association of a GCS identifier with vehicle cluster data and mission data results in association of the vehicle cluster data and mission data with GCS data and/or operating entity data of the GCS and/or GCS operating entity. For example, the association of the GCS identifier 301A with the vehicle cluster data 108A and mission data 110A further associates the vehicle cluster data 108A and mission data 110A with GCS data 112A and operating entity data 114A linked to the GCS identifier 301A.

In some embodiments, the master control data 106A includes data associated with a second GCS 310B and second vehicle cluster and/or mission. For example, the master control data 106A may include vehicle cluster data 108B associated with a second vehicle cluster, mission data 110B associated with a mission assigned to the second vehicle cluster, and GCS data 112B and operating entity data 114B associated with the second GCS 310B. The master control data 106A may further include a GCS identifier 301B linked to the GCS data 112B and/or operating entity data 114B. The apparatus 200A may associate the GCS identifier 301B with the vehicle cluster data 108B and mission data 110B, which results in association between the vehicle cluster data 108B and mission data 110B and the GCS data 112B and operating data 114B such that the associations may define an assignment of the vehicle cluster and mission to the second GCS 310B.

In some embodiments, mission data includes one or more handover conditions that may be monitored for satisfaction by the apparatus 200A, where satisfaction of a handover condition may cause the apparatus 200A to perform a handover process to reassign an associated vehicle, vehicle cluster, mission, and/or the like from a currently assigned GCS to a second GCS of the same GCC. For example, the mission data 110A may include one or more handover conditions 303. In some embodiments, the handover condition 303 may include one or more thresholds for detecting off-nominal activity at a GCS. For example, the handover condition 303 may include one or more thresholds for hardware performance, software performance, firmware performance, GCS operating entity conditions (e.g., thresholds for biological signals, behaviors, fatigue, and/or the like), vehicle performance, and/or the like. In another example, the handover condition 303 may include one or more workload thresholds, such as a threshold number of assigned vehicles, vehicle clusters, missions, and/or the like.

In some embodiments, the apparatus 200A may reassign vehicle clusters, or subsets of vehicle clusters, and missions from a first GCS to a second GCS by disassociating corresponding vehicle cluster data and mission data from a GCS identifier of the first GCS and associating the vehicle cluster data and mission data with a GCS identifier of the second GCS. For example, in response to a request from or determination that a handover condition 303 is satisfied (e.g., detection of off-nominal activity or an emergency at the first GCS), the apparatus 200A may receive or generate a control change indication. The control change indication may cause the apparatus 200 to reassign a vehicle cluster and mission from the GCS 310A associated with the GCS identifier 301A to the GCS 310B associated with the GCS identifier 301B. The handover process may include the apparatus 200A removing an association between the GCS identifier 301A and the vehicle cluster data 108A and mission data 110A and reassigning the vehicle cluster and mission to the second GCS 310B by associating the GCS identifier 301B with the vehicle cluster data 108A and mission data 110A.

In some embodiments, mission data includes one or more roaming conditions that may be monitored for satisfaction by the apparatus 200A, where satisfaction of a roaming condition may cause the apparatus 200A to perform a roaming process to reassign an associated vehicle, vehicle cluster, mission, and/or the like from a currently assigned GCS of a first GCC 103A to a second GCS of a second GCC 103B. For example, mission data 110A may include one or more roaming conditions 305. In some embodiments, the roaming condition 305 includes location- and/or proximity-based thresholds for initiating roaming in response to a vehicle or vehicle cluster being located beyond a predetermined proximity of a first GCC 103A or natural or artificial boundary, and/or for initiating roaming response to the vehicle or vehicle cluster being located within a predetermined proximity of a second GCC 103B or natural or artificial boundary. In some embodiments, the roaming condition 305 defines one or more off-nominal activities, off-nominal events, and/or or emergencies such that roaming may be performed in response to detection thereof. In one example, the roaming condition 305 may include loss of power at a GCC, loss of communication functionality at the GCC, loss of vehicle navigation and/or tracking functionality at the GCC, fire at the GCC, flooding at the GCC, and/or the like. In another example, the roaming condition 305 may include detection of vehicle collisions (or near vehicle collisions), flight plan deviation, vehicle instability, or other operational errors or violations for vehicles assigned to the GCC.

In some embodiments, the apparatus 200A performs a roaming process to reassign control of a vehicle cluster and mission from the GCS 310A (or GCS 310B) and GCC 103A associated with the master control data 106A to a GCS 310C (or GCS 310D) and GCC 103B associated with the master control data 106B. In some embodiments, the control apparatus 200A performs the reassignment by copying a subset of the master control data 106A corresponding to the vehicle, vehicle cluster, mission, and/or like, to the master control data 106B via communication between the apparatus 200A and the apparatus 200B in control of the GCS and GCC receiving the reassignment. For example, to roam a vehicle cluster and mission associated with the vehicle cluster data 108A and mission data 110A, the apparatus 200A may copy the vehicle cluster data 108A and mission data 110A to the master control data 106B via the apparatus 200B and a network 118. The apparatus 200B may assign the vehicle cluster and mission to the GCS 310C or GCS 310D at the second GCC 103B by associating the copied vehicle cluster data 108A and mission data 110A (e.g., and/or a mission data object indicated thereby) with a GCS identifier. For example, the apparatus 200B may associate the copied vehicle cluster data 108A and mission data 110A with a GCS identifier 301C such that the apparatus 200B enables the GCS 310C associated with the GCS identifier 301C to newly access the vehicle cluster data 108A and mission data 110A to monitor and control the vehicle cluster and mission.

FIG. 4 illustrates a diagram of example workflows for vehicle handover and vehicle roaming in accordance with at least some example embodiments of the present disclosure. Specifically, FIG. 4 illustrates a workflow 400A for vehicle handover and a workflow 400B for vehicle roaming. In various embodiments, elements of FIG. 4 that are associated with the workflow 400A for vehicle handover are depicted in a crossed pattern and interactions therebetween are depicted by dotted lines. In various embodiments, elements of FIG. 5 that are associated with the workflow 400B for vehicle roaming are depicted in a stippled pattern and interactions therebetween are depicted by dashed and dotted lines.

In some embodiments, the workflow 400A is performed by a first master control apparatus ("apparatus") 200A and first GCC 103A to handover control of a vehicle cluster 107A from a first GCS 105A to a second GCS 105B within the first GCC 103A. In some embodiments, the apparatus 200A establishes a connection between each of the first GCS 105A and second GCS 105B and the GCC 103A. For example, the apparatus 200A assigns the first GCS 105A and second GCS 105B to the GCC 103A such that the GCC 103A is able to access data corresponding to the first GCS 105A and second GCS 105B to enable monitoring and control of the first GCS 105A and second GCS 105B. The connection may cause the apparatus 200A or the GCC 103A to assign one or more vehicles or vehicle clusters to each of the first GCS 105A and second GCS 105B to enable the corresponding GCS to control and monitor the one or more assigned vehicles or vehicle clusters. The connection may also cause the apparatus 200A or GCC 105A to cause rendering of a ground user interface at each of the first GCS 105A and second GCS 105B that includes data corresponding to one or more vehicles assigned to each GCS. In some embodiments, the vehicle cluster 107B corresponds to a period following completion of the handover of the vehicle cluster 107A (e.g., the vehicle cluster 107B may represent the vehicle cluster 107A post-handover). In some embodiments, storage of assignments for the vehicle cluster 107A and data for controlling the vehicle cluster 107A is centralized at the GCC 103A and controlled by the apparatus 200A. In some embodiments, the apparatus 200A assigns the vehicle cluster 107A to the first GCS 105A such that the apparatus 200A enables the first GCS 105A to access data for controlling the vehicle cluster 107A and managing an associated mission of the vehicle cluster 107A. Additionally, or alternatively, in some embodiments, the first GCS 105A stores the data for controlling the vehicle cluster 107A. For example, the apparatus 200 may cause the first GCS 105A to store mission data, vehicle cluster data, and/or the like that enables the first GCS 105A to access, monitor, and control the vehicle cluster 107A (or an associated mission).

In some embodiments, the apparatus 200A receives or generates a control change indication for handover of the vehicle cluster 107A from the first GCS 105A to a second GCS 105B of the first GCC 103A. For example, the apparatus 200A may receive an indication of (or detect) off-nominal activity or an emergency at the first GCS 105A. In response to the indication of off-nominal activity or an emergency, the apparatus 200A may automatically initiate handover of the vehicle cluster 107A (or a subset of vehicles of the vehicle cluster 107A) from the first GCS 105A to another GCS at the first GCC 103A that is available to manage the vehicle cluster 107A and one or more associated missions.

In some embodiments, to handover the vehicle cluster 107A from the first GCS 105A to the second GCS 105B, the apparatus 200A reassigns the vehicle cluster 107A from the first GCS 105A to the second GCS 105B. In one example, the apparatus 200A may update, in one or more data stores, a recorded assignment for the vehicle cluster 107A to include an identifier for the second GCS 105B and delete an identifier for the first GCS 105A. The change in identifiers may enable the second GCS 105B to newly access data via the apparatus 200A for controlling the vehicle cluster 107A. In another example, alternatively, or additionally, the apparatus 200A may update mission data associated with the vehicle cluster 107A and/or GCS data associated with the first GCS 105A and/or second GCS 105B to indicate reassignment of the vehicle cluster 107A to the second GCS 105B. The updated mission data and/or GCS data may enable the GCS 105B to newly access data via the apparatus 200A for controlling the vehicle cluster 107A. In some embodiments, the apparatus 200A or GCC 103A causes rendering of a ground control interface at the GCS 105B, including one or more interfaces that enable a GCS operating entity to access air traffic data, access and initiate tactical options for the vehicle cluster 107B, observe and track mission progress for the vehicle cluster 107B, and/or the like, where each of the preceding functionalities may be provided in the same or separate rendered interfaces at the GCS 105B. Additionally, or alternatively, in some embodiments, the apparatus 200A causes the GCS 105B to receive and store the data for controlling the vehicle cluster 107A. For example, the apparatus 200 may cause the GCS 105B to store mission data, vehicle cluster data, and/or the like that enables the GCS 105A to access, monitor, and control the vehicle cluster 107A (or an associated mission) (e.g., where the apparatus 200 may provide the mission data, vehicle cluster data, and/or the like to the GCS 105B by copying the data to memory of the GCS 105B or causing the GCS 105B to access the data from one or more data stores via an application server).

In some embodiments, the workflow 400B is performed by the apparatus 200A and the first GCC 103A and a second master control apparatus ("apparatus") 200B and a second GCC 103B. For example, the apparatuses 200A, 200B and GCCs 103A, 103B may perform the workflow 400 to roam control of a vehicle cluster 107C from a GCS 105C of the first GCC 103A to a second GCS 105D of the second GCC 103B. In some embodiments, the apparatus 200B establishes a connection between the GCS 105C and the second GCC 103B. For example, the apparatus 200B assigns the GCS 105C to the second GCC 103B such that the GCC 103B is able to access data corresponding to the GCS 105C enable monitoring and control of the GCS 105C. The connection may cause the apparatus 200B or the GCC 105B to assign one or more vehicles or vehicle clusters to the GCS 105C to enable the GCS 105C to control and monitor the one or more vehicles or vehicle clusters. The connection may also cause the apparatus 200B or GCC 105B to cause rendering of a ground user interface at the GCS 105C that includes data corresponding to one or more vehicles assigned to the GCS 105C.

In some embodiments, the first GCC 103A is located at a first location 402 and the second GCC 103B is located at a second location 404, and UTM for the first location 402 and second location 404 may require unmanned vehicles within each location 402, 404 to be controlled by operating entities located within the respective location 402 or location 404. For example, the first location 402 may be within the Czech Republic and the second location 404 may be in Austria, which shares a border with the Czech Republic. UTM associated with the airspaces of the Czech Republic and Austria may require unmanned vehicles be controlled by operating entities within the respective country when the unmanned vehicle is within the country or within a predetermined proximity to the country border. The apparatuses 200A, 200B may perform the workflow 400B to roam control of vehicle clusters to ensure compliance with the UTM policy. For example, the apparatus 200A may initiate the workflow 400B in response to receiving a location of the vehicle cluster 107C and determining that the location is within a predetermined proximity of the border between the Czech Republic and Austria, is beyond a predetermined proximity of the location of the GCC 103A, and/or is within a predetermined proximity of the location of the GCC 103B.

In some embodiments, the vehicle cluster 107D corresponds to a period following completion of the roaming of the vehicle cluster 107C (e.g., the vehicle cluster 107D may represent the vehicle cluster 107C post-roaming). In some embodiments, storage of assignments for the vehicle cluster 107C and data for controlling the vehicle cluster 107C is centralized at the GCC 103A and controlled by the apparatus 200A. In some embodiments, to roam the vehicle cluster 107C, the apparatus 200A copies the assignments and data for controlling the vehicle cluster 107C to the apparatus 200B. In some embodiments, the apparatuses 200A, 200B reassigns the vehicle cluster 107C from the GCS 105C to the GCS 105D such that the apparatuses 200A, 200B enable the GCS 105D to access data for controlling the vehicle cluster 107C and managing an associated mission of the vehicle cluster 107C.

In some embodiments, the apparatus 200A monitors the vehicle cluster 107C to determine if one or more roaming conditions are satisfied. For example, the apparatus 200A determine that a location of the vehicle cluster 107C is within a predetermined proximity of a border or other predefined boundary, is beyond a predetermined proximity of the GCC 103A, and/or is within a predetermined proximity of the location of the GCC 103B. In some embodiments, in response to determining the roaming condition is satisfied, the apparatus 200A causes the first GCC 103A to provide a roaming request to the second GCC 103B (or to the apparatus 200B, which relays the request to the second GCC 103B). In some embodiments, the apparatus 200A receives a response to the roaming request, which may include an acceptance of the roaming request and an indication of availability of the GCS 105D to receive reassignment of the vehicle cluster 107C. In other embodiments, the apparatus 200A automatically identifies an available GCS at the second GCC 103B and reassigns the vehicle cluster 107C to the available GCS.

In some embodiments, to roam the vehicle cluster 107C, the apparatus 200A copies data associated with controlling the vehicle cluster 107C to the apparatus 200B such that the GCS 105D is able to access the data and control the vehicle cluster 107C (e.g., depicted as vehicle cluster 107D following the roaming operation). In some embodiments, the apparatus 200A copies vehicle cluster data, mission data, and/or the like to the apparatus 200B. The vehicle cluster data and/or mission data may include or embody one or more flight mission data objects including navigational data, tactical data, vehicle data, and/or the like, for managing the vehicle cluster 107D and one or more associated missions. In some embodiments, the apparatus 200A or apparatus 200B causes rendering of a ground control interface at the GCS 105D that includes the vehicle cluster data, mission data, and/or the like. For example, the ground control interface may include a navigation interface for displaying and tracking a location of the vehicle cluster 107D, a fleet/planning interface for displaying air traffic data, a tactical interface for displaying tactical options respective to the vehicle cluster 107D (e.g., request handover, request roaming, adjust flight controls for speed and/or direction, initiate emergency landing, release or collect payload, and/or the like), and/or a mission interface for displaying and tracking mission progress of the vehicle cluster 107D.

FIG. 5 illustrates a diagram of mission reassignment in vehicle handover in accordance with at least some example embodiments of the present disclosure. Specifically, the diagram shown in FIG. 5 depicts a first GCS 105A, a second GCS 105B, a GCC 103 associated with the first GCS 105A and the second GCS 105B, and a master control apparatus ("apparatus") 200 that controls the GCC 103 including the first GCS 105A and second GCS 105B. In some embodiments, the GCC 103 provides centralized data storage for mission data associated with each vehicle and/or vehicle cluster assigned to the first GCS 105A or second GCS 105B.

For example, the GCC 103 may store mission data 110A, 108B, 108C that are each associated with a respective vehicle 507A, 507B, 507C, which may be of the same vehicle cluster or of different vehicle clusters. For example, the vehicles 507A, 507B, and 507C may be vehicles associated with the same vehicle cluster. In another example, the vehicles 507A and 507B are associated with a first vehicle cluster and the vehicle 507C is associated with a second vehicle cluster. In various embodiments, the master control apparatus 200 may perform a handover process to handover vehicle control from a first GCS 105A to a second GCS 105B of the same GCC (e.g., where handover may be performed for an entire vehicle cluster or subsets of a vehicle cluster, such as on a vehicle-by-vehicle reassignment basis).

In some contexts, the vehicles 507A, 507B, 507C may each be assigned to the first GCS 105A. As depicted by the dashed and dotted indicator lines, in some contexts, the apparatus 200 may enable the first GCS 105A to access, using an application server 501A, the corresponding mission data 110A, 110B, 110C to enable the first GCS 105A to monitor and control the vehicles clusters 507A, 507B, 507C (e.g., both individually and collectively as a vehicle cluster). In some contexts, the GCC 103 may also store mission data 110D associated with a vehicle 507D. The vehicle 507D may be assigned to the second GCS 105B. As depicted by the solid indicator lines, in some contexts, the apparatus 200 may enable the second GCS 105B to access, using an application server 501B, the mission data 110D to enable the second GCS 105B to monitor and control the vehicle 507D.

In some embodiments, the apparatus 200 causes rendering of a ground control interface 501A at the display 115A of the first GCS 105A and a ground control interface 501B at the display 115B of the second GCS 105B. In some embodiments, each of the ground control interfaces 501A, 501B display data associated with monitoring and controlling the vehicles and/or vehicle clusters assigned to the first GCS 105A or second GCS 105B to enable mission management by the first GCS 105A or second GCS 105B (e.g., or associated GCS operating entities). In some embodiments, the apparatus 200 (or application server 501A or 501B) generates and provides the ground control interface based on mission data, vehicle cluster data, and/or the like, some of which may be received by the apparatus 200 from one or more external computing entities or systems, including vehicle clusters, radar monitoring stations, weather systems, UTM infrastructure, and/or the like. In some embodiments, each of the ground control interfaces 501A, 501B includes a fleet/planning interface 503 that enables monitoring of air traffic respective to one or more vehicles and/or vehicle clusters assigned to the GCS. For example, the fleet/planning interface 503 may include data and data visualizations indicative of relative locations, bearings, headings, speeds, altitudes, and/or the like, of unmanned aerial vehicles (UAVs) and manned aerial vehicles in an airspace associated with the GCC 103.

In some embodiments, each of the ground control interfaces 501A, 501B includes a tactical interface 505 that enables monitoring of the status of each assigned vehicle (and/or each assigned vehicle cluster) and presentation and selection of tactical options for one or more assigned vehicles or vehicle clusters. For example, the tactical interface 505 may include vehicle battery power (or other power indications, such as time to depletion), vehicle payload weight, vehicle camera feeds, other vehicle sensor feeds (e.g., radar, temperature, pressure, vehicle speed, windspeed, wind direction, and/or the like), and/or vehicle component statuses (e.g., rotor stability, rotor integrity, motor current, and/or the like). In another example, the tactical interface 505 may include selectable tactical options, such as selectable fields for requesting vehicle handover, requesting vehicle roaming, adjusting flight controls for speed and/or direction, initiating emergency landing, releasing or collecting a payload, and/or the like.

In some embodiments, each of the ground control interfaces 501A, 501B includes a navigation interface 506 that enables monitoring of vehicle cluster and/or individual vehicle location. For example, the navigation interface 506 may include a map on which are displayed real-time locations of vehicle clusters and/or individual vehicles. In some embodiments, the navigation interface 506 includes a flight plan or other mapping element for indicating a travel pathway and/or destination of a vehicle cluster or a subset of vehicles of a vehicle cluster. In some embodiments, the navigation interface 506 includes visual elements indicative of roaming conditions. For example, the navigation interface 506 may include a rendering of a border or boundary at or approximate to which vehicle roaming may be initiated. In another example, the navigation interface 506 may include a rendering of one or more geozones respective to GCC location, borders, boundaries, mission destinations, and/or the like). The navigation interface 506 may also include visual indications of vehicle proximities (e.g., travel distances or travel times) to the geozones to enable real-time awareness and tracking of when vehicle roaming may be requested or automatically initiated.

In some embodiments, the apparatus 200 performs vehicle handover by reassigning mission data, and potentially other data enabling control of an individual vehicle or a vehicle cluster, from a first GCS of a GCC to a second GCS of the GCC. For example, to perform vehicle handover of the vehicle 507C from the GCS 105A to the GCS 105B, the apparatus 200 may reassign the mission data 110C from the first GCS 105A to the second GCS 105B such that the second GCS 105B is able to newly access the mission data 110C via the application server 501B and apparatus 200. In some embodiments, to perform vehicle handover for the vehicle 507C, the apparatus 200 enables the application server 501B to access the mission data 110C and disables the application server 501A from accessing the mission data 110C. In some embodiments, the apparatus 200 causes rendering or updating of the ground control interfaces 501A, 501B based on the vehicle handover. For example, the apparatus 200 may update the ground control interface 501A to remove visual elements associated with monitoring and controlling the vehicle 507C. In another example, the apparatus 200 may cause rendering of the ground control interface 501B to include visual elements associated with monitoring and controlling the vehicle 507C, such as by updating the fleet/planning interface 503, tactical interface 505, and/or navigation interface 506.

FIG. 6 illustrates a functional band diagram depicting operations of an example workflow for vehicle handover in accordance with at least some example embodiments of the present disclosure. Specifically, FIG. 6 depicts a functional band diagram of an example workflow 600 for performing handover of a vehicle (including control of the vehicle and responsibility for the corresponding mission) from a first GCS of a GCC to a second GCS of the GCC. In some embodiments, the workflow 600 is embodied by computer program code stored on a non-transitory computer-readable storage medium of a computer program product configured for execution to perform the process as depicted and described. Additionally, or alternatively, in some embodiments, the workflow 600 is performed by one or more specially configured computing devices, such as the master control apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 203 and/or another component depicted and/or described herein and/or otherwise accessible to the apparatus 200, for performing the operations as depicted and described. In some embodiments, the apparatus 200 is controlled by a GCC master operating entity including a human, an autonomous computing entity, and/or the like.

In some embodiments, the apparatus 200 is in communication with one or more external apparatus(es), system(s), device(s), and/or the like, to perform one or more of the operations as depicted and described. For example, the apparatus 200 in some embodiments is in communication with two or more GCSs of a GCC. For purposes of simplifying the description, the workflow 600 is described as performed by and from the perspective of the apparatus 200. In some embodiments, the apparatus 200 automatically initiates the workflow 600 in response to receiving from a first GCS (or generating) a control change indication that indicates reassignment of one or more vehicles from the first GCS to a second GCS, where the first GCS and second GCS are associated with the same GCC. In other embodiments, the apparatus 200 automatically initiates the workflow 600 in response to receiving an indication of (or detecting) off-nominal activity or an emergency at a GCS, such as a software fault, hardware fault, incapacitation of a GCS operating entity, excess workload, and/or the like.

In some embodiments, the workflow 600 includes the master control apparatus 200 ("apparatus 200") determining whether an off-nominal event is occurring or has occurred at the GCS 105 (see indicium 1). In some embodiments, the workflow 600 includes the apparatus 200 detecting, or receiving an indication of, an off-nominal event at a GCS 105. In some embodiments, the off-nominal event includes a high workload of the GCS 105 and/or GCS operating entity due to contingency, emergency, and/or the like. Additionally, or alternatively, in some embodiments, the off-nominal event includes a workload rebalancing operation initiated by the apparatus 200, GCC 103, or GCS 105 (e.g., or corresponding operating entities) to balance GCC workload and resources among GCSs of the GCC. Additionally, or alternatively, in some embodiments, the off-nominal event includes a software fault, hardware fault, or other performance and/or safety-related issue or activity at the GCS 105 and/or GCS operating entity.

In one example, while the GCS operating entity of a first GCS 105 is monitoring the vehicle cluster under his/her responsibility, the GCC 103 may propose three missions (e.g., flight plan contingencies) to the GCS operating entity, such as via rendering of a graphical user interface (GUI) at the first GCS 105. The GCS operating entity may be overwhelmed due to sudden increase in workload based on the sudden assignment of unexpected tasks to the first GCS 105. In response, the GCS operating entity may determine to request handover of one or more assigned vehicles (e.g., including a subset of or an entire vehicle cluster) to a second GCS 105 and second GCS operating entity such that the GCS operating entity of the first GCS 105 may better perform tasks for the currently assigned vehicles and missions and/or a subset of the newly assigned vehicles and missions. The apparatus 200 and/or GCC master operating entity may receive the request and initiate a handover operation to reassign the one or more assigned vehicles and corresponding missions from the first GCS 105 to a second GCS 105.

In some embodiments, the workflow 600 includes the apparatus 200 generating and providing a request for dedicated control of one or more vehicles (and associated one or more associated missions) to the GCC 103 in response to receiving an indication of or detecting an off-nominal event at the GCS 105 (see indicium 2). The request for dedicated control may be a request (or a command) to reassign the one or more vehicles from the GCS 105 to another GCS of the GCC 103. In some embodiments, the workflow 600 includes the GCC 103, in response to receipt of the request for dedicated control, generating one or more candidate GCSs and corresponding GCS operating entities to which the one or more vehicles may be reassigned (see indicium 3). For example, a processing element of the GCC 103 may determine a current workload of each of a plurality of other GCSs at the GCC 103, generate a ranking of the plurality of other GCSs based on the current workload (e.g., a top- or bottom-ranked entry being associated with a lowest current workload), and generate the one or more candidate GCSs based on the ranking. In some embodiments, the apparatus 200 determines an availability of GCSs at the GCC 103 to identify a GCS to which the vehicle may be reassigned. For example, the apparatus 200 may receive an indication of (or determine) a status of availability of each GCS at the GCC 103. The status of availability may include online busy, nominal activity in managing currently assigned vehicles, off-nominal activity in managing currently assigned vehicles, and/or the like. The apparatus 200 may determine a candidate GCS for reassignment of the vehicle by identifying a GCS that is associated with an online status or nominal activity in managing currently assigned vehicles.

In some embodiments, the workflow 600 includes the GCC 103 providing a notification to the one or more candidate GCSs that indicates and/or requests reassignment of the vehicle (see indicium 4). For example, the GCC 103 may cause rendering of a GUI on a second GCS 105, where the GUI indicates one or more mission data objects associated with the vehicle for which reassignment is requested. The GUI may include selectable fields to accept or reject assignment of the vehicle and association mission. In some embodiments, the GCC 103, or apparatus 200, provides a notification to the first GCS 105 that indicates the vehicle for which reassignment was requested is in the process of being reassigned to another GCS. For example, the notification may indicate that the GCS operating entity of the first GCS 105 is still responsible for managing the vehicle and associated mission, but another GCS operating entity of a second GCS 105 is reviewing the vehicle and mission such that the vehicle and mission may be reassigned to the second GCS 105. In some embodiments, the workflow 600 includes the second GCS 105 and/or associated GCS operating entity reviewing the notification indicative of or requesting reassignment of the vehicle (see indicium 5).

In some embodiments, the workflow 600 includes the apparatus 200 determining whether the second GCS 105 (e.g., the GCS candidate identified by the apparatus 200 or GCC 103) accepts assignment of the vehicle (see indicium 6). For example, the apparatus 200 may receive a user input from the second GCS 105 that indicates acceptance or rejection of the assignment of the vehicle. In some embodiments, in response to determining the second GCS 105 accepts the assignment of the vehicle, the workflow 600 includes the GCC 103, or apparatus 200, providing a notification to one or more affected GCSs (see indicium 7). For example, the GCC 103 may provide a first notification to the first GCS 105 that indicates the acceptance of and reassignment of the vehicle to the second GCS 105. Additionally, or alternatively, the GCC 103 may provide a second notification to the second GCS 105 that confirms the assignment of the vehicle to the second GCS 105. In some embodiments, in response to determining the second GCS 105 accepts the assignment of the vehicle, the apparatus 200 reassigns the vehicle to the second GCS 105 such that the second GCS 105 is able to newly access data corresponding to the vehicle to enable monitoring and control of the vehicle by the second GCS 105. In some embodiments, in response to determining the second GCS 105 rejects assignment of the vehicle, the workflow 600 includes the apparatus 200 reviewing a status of each GCS of the GCC 103 to determine whether the vehicle may be reassigned to any of the GCSs (see indicium 8). For example, the apparatus 200 and/or GCC 103 may determine an additional candidate GCS associated with an online status, a current nominal activity status, and/or the like, and may provide a notification to the additional candidate GCS to request approval for reassignment of the vehicle.

In some embodiments, the workflow 600 includes the apparatus 200 detecting, or receiving an indication of, nominal activity in management of currently assigned vehicles by the GCS 105. Alternatively, or additionally, in some embodiments, the workflow 600 includes the apparatus determining that no off-nominal activities are occurring at or in association with the GCS 105. In some embodiments, the workflow 600 includes the apparatus 200 reviewing a workload of one or more GCSs of the GCC 103 (see indicium 9). The workload may include a number of vehicles currently assigned to a GCS, a number of vehicle clusters currently assigned to the GCS, a number of vehicles in a vehicle cluster currently assigned to the GCS, a complexity level of one or more missions associated with vehicles currently assigned to the GCS, and/or the like. The complexity level may refer to a travel distance of a mission, a time to perform a mission, a number of tasks associated with managing a mission, a criticality of the mission, and/or the like. The criticality of a mission may be relativistic based on a type of the mission. For example, missions involving transportation of humans may be associated with a greater criticality level as compared to missions involving movement of non-human cargo. In another example, missions involving transportation of emergency-related cargo may be associated with a greater criticality level as compared to missions involving delivery of commercial or consumer cargo.

In some embodiments, based on reviewing the workload of the GCS 105 and/or other GCSs of the GCC 103, the workflow 600 includes the apparatus 200 determining whether to rebalance the workload of one or more GCSs at the GCC 103 (see indicium 10). In some embodiments, the apparatus 200 determines that the workload of one or more GCSs exceeds a predetermined threshold, which may be interpreted by the apparatus 200 as indicating that the GCS is overloaded and may require reassignment of one or more vehicles or vehicle clusters. For example, the apparatus 200 may determine that a current number of vehicle clusters assigned to a GCS exceeds a predetermined threshold. In another example, the apparatus 200 may determine that a current number of vehicles (of one or multiple vehicle clusters) exceeds a predetermined threshold. In some embodiments, the apparatus 200 determines that the workload of one or more GCSs fails to meet a predetermined threshold, which may be interpreted by the apparatus 200 as indicating the GCS is underloaded and may be available to receive reassignment of one or more vehicles or vehicle clusters. For example, the apparatus 200 may determine that a current number of vehicle clusters or number of vehicles assigned to a GCS is less than a predetermined threshold.

In some embodiments, the apparatus 200 determines that the complexity of a workload of a GCS requires review of whether one or more vehicles or vehicle clusters currently assigned to the GCS may be reassigned to another GCS at the GCC 103. For example, the apparatus 200 may determine that a first vehicle cluster associated with air-taxi services and a plurality of additional vehicle clusters associated with delivery of consumer goods are currently assigned to the same GCS. The apparatus 200 may determine that a complexity of managing both the first vehicle cluster and each of the plurality of additional vehicle clusters exceeds a predetermined threshold. The apparatus 200 may determine that a subset of the plurality of additional vehicle clusters should be reassigned to another GCS such that a GCS operating entity of the first GCS may better manage the first vehicle cluster and a remaining subset of the plurality of additional vehicle clusters. In some embodiments, in response to determining that a workload of one or more GCSs requires rebalancing (e.g., due to overload or underload), the workflow 600 includes the apparatus 200 reviewing a status of each GCS of the GCC 103 to determine whether one or more vehicles or vehicle clusters may be reassigned to (or from) the GCSs identified by the apparatus 200 as being underloaded (or overloaded) (see indicium 8).

In some embodiments, the workflow 600 includes the apparatus 200 causing the GCS 105 to perform a workload self-assessment (see indicium 11). For example, the apparatus 200 may cause rendering of a GUI at the GCS 105 including one or more user input fields for receiving user input indicative of a workload level of the GCS 105. In another example, the apparatus 200 may cause the GCS 105 to perform a diagnostic operation to determine a current workload, such as a current number of assigned vehicles, current number assigned vehicle clusters, mission complexities, and/or the like.

In some embodiments, the workflow 600 includes the GCS 105 determining whether the current workload is too high (or, alternatively, too low) based on the workload self-assessment (see indicium 12). For example, the GCS 105 may determine whether the current workload is associated with an overloaded condition, a nominal condition, or an underloaded condition, such as by applying one or more thresholds and/or other policies to the determined current workload. In some embodiments, in response to determining the current workload is too high, the workflow 600 includes the GCS 105 providing a handover request to the apparatus 200 to request to reassignment of one or more vehicles or vehicle clusters from the GCS 105 to another GCS of the GCC 103 (see indicium 13). For example, the apparatus 200 may receive a handover request including data that identifies one or more vehicles, vehicle clusters, and/or missions. In some embodiments, in response to the handover requests, the workflow 600 includes the apparatus 200 reviewing a status of each GCS of the GCC 103 to determine whether one or more vehicles or vehicle clusters may be reassigned to (or from) the GCS 105 requesting handover to other GCSs of the GCC 103 (see indicium 8).

FIG. 7 illustrates a functional band diagram depicting operations of an example workflow for vehicle handover in accordance with at least some example embodiments of the present disclosure. Specifically, FIG. 7 depicts a functional band diagram of an example workflow 700 for performing roaming of a vehicle including reassigning the vehicle (e.g., including control of the vehicle and responsibility for the corresponding mission) from a first GCS of a GCC to a second GCS of a second GCC. In some embodiments, the workflow 700 is embodied by computer program code stored on a non-transitory computer-readable storage medium of a computer program product configured for execution to perform the process as depicted and described. Additionally, or alternatively, in some embodiments, the workflow 700 is performed by one or more specially configured computing devices, such as the master control apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 203 and/or another component depicted and/or described herein and/or otherwise accessible to the apparatus 200, for performing the operations as depicted and described. In some embodiments, the apparatus 200 is controlled by a GCC master operating entity including a human, an autonomous computing entity, and/or the like.

In some embodiments, the workflow 700 includes the master control apparatus 200 ("apparatus 200") monitoring one or more roaming conditions for a vehicle, vehicle cluster, and/or mission (see indicium 21). The one or more roaming conditions may be stored as mission data, such as in one or more flight mission data objects, accessible to the apparatus 200. In some embodiments, the roaming condition includes a proximity of the vehicle to a first GCC 103, where the vehicle is currently assigned to a GCS 105 at the first GCC 103. In some embodiments, the apparatus 200 receives a location of the vehicle and compares the location of the vehicle to a location of the first GCC 103. For example, the apparatus 200 may generate a proximity metric, such as an absolute distance or travel time, between the location of the vehicle and the location of the first GCC 103.

Alternatively, or additionally, in some embodiments, the roaming condition includes a proximity of the vehicle to a second GCC 103, where the vehicle is not currently assigned to the second GCC 103 any GCS 105 associated with the second GCC 103. In some embodiments, the apparatus 200 receives a location of the vehicle and compares the location of the vehicle to a location of the second GCC 103. For example, the apparatus 200 may generate a proximity metric, such as an absolute distance or travel time, between the location of the vehicle and the location of the second GCC 103.

Alternatively, or additionally, in some embodiments, the roaming condition includes a proximity of the vehicle to a border or boundary. For example, the roaming condition may be a proximity of the vehicle to a city boundary, country boundary, state or provincial boundary, airspace boundary, economic zone boundary, time zone boundary, and/or the like. In some embodiments, the apparatus 200 receives a location of the vehicle and compares the location of the vehicle to one or more borders or boundaries, which may be indicated in mission data associated with the vehicle. For example, the apparatus 200 may generate a proximity metric, such as an absolute distance or travel time, between the location of the vehicle and the border or boundary.

In some embodiments, the roaming condition includes one or more statuses of the first GCC 103 including statuses indicative of an emergency or off-nominal activity or event at the first GCC 103. In some embodiments, the apparatus 200 monitors the GCC 103 and/or receives data by which the one or more statuses are determined. In one example, the apparatus 200 may detect whether the first GCC 103 has experienced a power failure and/or communication failure, which may prevent the first GCC 103 from properly managing currently assigned vehicles and missions. In another example, the apparatus 200 may detect whether the first GCC 103 is experiencing a fire, flood, tornado, earthquake, biohazard, active shooter, or other natural or artificial emergency. In still another example, the apparatus 200 may detect whether one or more vehicles currently assigned to the first GCC 103 demonstrate off-nominal activity, such as deviation from a flight plan, excess or reduced speed, aggressive maneuvering, potential or confirmed collision with other vehicles or objects, and/or the like.

In some embodiments, the workflow 700 includes the apparatus 200 determining whether roaming is needed for one or more vehicles currently assigned to the first GCC 103 (see indicium 22). In some embodiments, the apparatus 200 determines whether the proximity of the vehicle to the first GCC 103 exceeds a predetermined threshold. For example, the apparatus 200 may determine whether the vehicle has moved beyond a threshold proximity of the first GCC 103. Alternatively, or additionally, in some embodiments, the apparatus 200 determines whether the proximity of the vehicle to the second GCC 103 meets a predetermined threshold. For example, the apparatus 200 may determine whether the vehicle has moved with a threshold proximity of the second GCC 103. In some embodiments, the apparatus 200 receives, from a GCC master operating entity, a GCS operating entity, or other operating entity of the first GCC 103, a request to roam one or more vehicles currently assigned to the first GCC 103.

In some embodiments, in response to determining or receiving an indication of a power failure and/or communication failure at the first GCC 103, the apparatus 200 determines that the one or more vehicles currently assigned to the first GCC 103 should be roamed. In some embodiments, in response to detecting or receiving an indication of an emergency at the first GCC 103, the apparatus 200 determines that the one or more vehicles currently assigned to the first GCC 103 should be roamed. As described above, the determination to roam a vehicle between GCCs may be based on preconfigured roaming conditions associated with carrying out a vehicle mission in a nominal scenario (e.g., roaming based on proximity to GCCs, airspaces, borders, and/or the like) or roaming conditions associated with an off-nominal scenario, such as loss of power, loss of communications, off-nominal activity at the vehicle or GCC, or an emergency at the GCC.

In some embodiments, in response to determining a need to roam one or more vehicles currently assigned to the first GCC 103, the workflow 700 includes the apparatus 200 requesting roaming of the vehicle (see indicium 23). In some embodiments, the apparatus 200 generates and provides to the first GCC 103 a roaming request. The roaming request may indicate the vehicle, such as via a vehicle identifier. The roaming request may indicate one or more roaming conditions determined to be met, such as an indication that the vehicle is beyond a predetermined proximity of the first GCC 103 and/or within a predetermined proximity of a second GCC. In some embodiments, the apparatus 200 causes rendering of a graphical user interface (GUI) at a control station, terminal, or other computing device associated with the first GCC 103, where the GUI includes the roaming request. For example, the first GCC 103 may include a GCC operating entity. The apparatus 200 may automatically (e.g., or in response to user input from a GCC master operating entity) provide the roaming request to a computing device of the GCC operating entity to cause the computing device to render a GUI including the roaming request.

In some embodiments, the workflow 700 includes the first GCC 103, or GCC operating entity thereof, communicating with a second GCC 103 to determine if one or more GCSs 105 of the second GCC 103 are available to receive reassignment of the one or more vehicles (see indicium 24). In some embodiments, the first GCC 103 relays the roaming request to the second GCC 103. In some embodiments, the first GCC 103 receives from the second GCC 103 a status of availability for one or more GCSs 105 of the second GCC 103. For example, the first GCC 103 may receive an indication of whether one or more GCSs 105 of the second GCC 103 are online, busy, demonstrating nominal activity in managing currently assigned vehicles, demonstrating off-nominal activity in managing currently assigned vehicles, and/or the like. In another example, the first GCC 103 may receive an indication of whether one or more GCS operating entities of GCSs 105 at the second GCC 103 are on-duty and available, such as based on time zone, a shift schedule, and/or the like. In some embodiments, the first GCC 103 determines one or more available GCSs 105 at the second GCC 103. For example, based on communication with the second GCC 103, the first GCC 103 may determine that at least one GCS 105 at the second GCC 103 is available to receive reassignment of the one or more vehicles.

In some embodiments, the workflow 700 includes the first GCC 103, second GCC 103, or apparatus 200 of the first GCC 103 or second GCC 103 providing a notification to one or more affected GCSs 105 and/or GCS operating entities (see indicium 25). The notification may indicate the imminent reassignment (e.g., roaming) of the one or more vehicles from the first GCC 103 to the second GCC 103. For example, the first GCC 103 may provide a notification to a GCS 105 of the first GCC 103 to which the vehicle is currently assigned, where the notification indicates that the vehicle is subject to an ongoing roaming procedure and will be reassigned to a GCS 105 of a second GCC 103. The second GCC 103 may provide a notification to the GCS 105 of the second GCC 103, where the notification indicates that the vehicle is subject to an ongoing roaming procedure and will be reassigned to the GCS 105.

In some embodiments, the workflow 700 includes the GCS 105 (and/or associated GCS operating entity) of the second GCC 103 reviewing a notification indicative of or requesting reassignment of the vehicle to the GCS 105 (see indicium 26). In some embodiments, the workflow 700 includes determining whether the second GCS 105 (e.g., the GCS candidate identified by the apparatus 200 or GCC 103) accepts roaming of the vehicle (see indicium 27). For example, the GCS 105 may receive a user input for indicating acceptance or rejection of the roaming of the vehicle. The GCS 105 may provide the user input to the second GCC 103 and/or apparatus 200 in control of the second GCC 103. The second GCC 103, or apparatus 200 in control thereof, may relay the user input (e.g., or an indication of roaming acceptance or rejection based thereon) to the first GCC 103 or the apparatus 200 in control of the first GCC 103. In some embodiments, in response to the GCS 105 of the second GCC 103 rejecting roaming of the vehicle, the apparatus 200 generates and provides a new roaming request to the first GCC 103 such that the first GCC 103 repeats the above-described operations with the second GCC 103 (or another GCC 103) to identify a new candidate GCS 105 at the second GCC 103 that may receive reassignment of the vehicle.

In some embodiments, the apparatus 200 of the GCC 103 automatically roams the one or more vehicles from the first GCC 103 to the second GCC 103 by reassigning the vehicle from the first GCC 103 to the second GCC 103. In some embodiments, the apparatus 200 of the first GCC 103 reassigns the vehicle from the currently assigned GCS 105 of the first GCC 103 to a GCS 105 of the second GCC 103. In some embodiments, the apparatus 200 of the first GCC 103 copies data corresponding to the vehicle (e.g., mission data, vehicle cluster data, and/or the like) to the apparatus 200 of the second GCC 103 to enable control of the vehicle via the GCS 105 of the second GCC 103. In some embodiments, the apparatus 200 of the first GCC 103 unassigns the vehicle from the GCS 105 of the first GCC 103. For example, in response to the apparatus 200 of the first GCC 103 receiving confirmation of successful assignment of the vehicle to the GCS 105 of the second GCC 103, the apparatus 200 may remove an assignment of the vehicle to the GCS 105 of the first GCC 103.

In some embodiments, in response to roaming of the one or more vehicles, the workflow 700 includes the first GCC 103 and/or second GCC 103 (or either or both of the apparatuses 200 in control thereof) providing a notification to one or more affected GCSs (see indicium 28). For example, the first GCC 103 may provide a first notification to the GCS 105 of the first GCC 103 that indicates the roaming of the vehicle to the GCS 105 of the second GCC 103. Additionally, or alternatively, the second GCC 103 may provide a second notification to the GCS 105 of the second GCC 103 that confirms roaming of the vehicle to the second GCS 105.

Example Processes of the Disclosure

Having described example systems and apparatuses, data architectures, data flows, and graphical representations in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 8 illustrates a flowchart depicting operations of an example process for vehicle handover using ground control stations (GCSs) in accordance with at least some example embodiments of the present disclosure. Specifically, FIG. 8 depicts operations of an example process 800. In some embodiments, the process 800 is embodied by computer program code stored on a non-transitory computer-readable storage medium of a computer program product configured for execution to perform the process as depicted and described. Additionally, or alternatively, in some embodiments, the process 800 is performed by one or more specially configured computing devices, such as the master control apparatus ("apparatus") 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 203 and/or another component depicted and/or described herein and/or otherwise accessible to the apparatus 200, for performing the operations as depicted and described. In some embodiments, the apparatus 200 is in communication with one or more internal or external apparatus(es), system(s), device(s), and/or the like, to perform one or more of the operations as depicted and described. For example, the apparatus 200 in some embodiments is in communication with a GCC, GCC operating entity, two or more GCSs associated with the GCC, and a respective GCS operating entity associated with each GCS. For purposes of simplifying the description, the process 800 is described as performed by and from the perspective of the apparatus 200. In some embodiments, the apparatus 200 initiates the process 800 in response to receiving a handover request from a GCS, such as via user input to an input device of the GCS or in response to the GCS or GCS operating entity experiencing off-nominal activity or an emergency (e.g., software fault, hardware fault, loss of power, loss of communication, equipment or facility overheat, fire, water damage, operator fatigue incapacitation, operator removal, cyberattack, bomb blast, electromagnetic pulse or other electromagnetic field phenomena, and/or the like). Further example aspects of vehicle control processes are depicted in the workflow 900 of FIG. 9 and described herein.

At operation 803, the apparatus 200 includes means such as the ground control center (GCC) controlling circuitry, the ground control station (GCS) controlling circuitry, the communications circuitry 205, the input/output circuitry 207, the processor 201, and/or the like, or a combination thereof, that establish a connection between a ground control station (GCS) and a ground control center (GCC). For example, the apparatus 200 may establish a connection between a GCS 105 and a GCC 103. In some embodiments, the connection enables the GCC to newly access data associated with controlling and monitoring the GCS. For example, the connection may enable the GCC to access GCS data and/or operating entity data to enable control and monitoring of the GCS. In some embodiments, the connection enables the apparatus 200 and/or GCC to assign one or more vehicles, vehicle clusters, missions, and or the like, associated with the GCC to the GCS. For example, the connection enables the apparatus 200 or GCC to assign a subset of a plurality of vehicles associated with the GCC to a GCS such that the GCS is able to newly access data corresponding to the subset of the plurality of vehicles to control and monitor the subset of the plurality of vehicles. In some embodiments, the apparatus 200 causes the GCS to store data for monitoring and controlling the vehicle, vehicle cluster, mission, and/or the like. For example, the apparatus 200 may cause the GCS to store mission data, vehicle cluster data, and/or the like that enables the GCS to access, monitor, and control the vehicle, vehicle cluster, mission, and/or the like. The apparatus where the apparatus 200 may provide the mission data, vehicle cluster data, and/or the like to the GCS by copying the data to memory of the GCS and/or by causing the GCS to access the data from one or more data stores via an application server.

In some embodiments, establishing the connection between the GCS and the GCC includes causing rendering of a ground control interface at the GCS. For example, the apparatus 200 may cause rendering of a ground control interface at a display 115 of a first GCS 105. In some embodiments, the ground control interface includes mission data indicative of one or more flight mission data objects associated with one or more vehicles (or vehicle clusters) assigned to the first GCS 105. For example, the flight mission data object may define a mission of a vehicle (e.g., air-taxi, delivery, photography or reconnaissance, mapping, and/or the like) and the ground control interface may include mission data indicative of the defined mission. In another example, the flight mission data object may indicate one or more vehicle statuses, a flight plan or other vehicle travel plan, vehicle traffic data, and/or a history of communication between the first GCS (e.g., and potentially other GCSs) and one or mor airspace-controlling entities (e.g., unmanned aircraft system traffic management (UTM) or a U-space service provider (USSP)). In some embodiments, the ground control interface includes vehicle cluster data associated with one or more vehicles or vehicle clusters assigned to the first GCS 105. In some embodiments, the ground control interface includes a fleet/planning interface, a tactical interface, and/or a navigational interface.

At operation 806, the apparatus 200 includes means such as the GCC controlling circuitry, the GCS controlling circuitry, the communications circuitry 205, the input/output circuitry 207, the processor 201, and/or the like, or a combination thereof, that optionally detect an off-nominal event or activity at the GCS. For example, the apparatus 200 may monitor the first GCS to determine if the GCS is demonstrating nominal performance in managing a vehicle, vehicle cluster, or subset of vehicles of a vehicle cluster, which may include determining vehicle statuses such as accuracy and/or precision to a predefined travel path, prescribed vehicle speed range, stability of vehicle movement, detection of near or actual vehicle collisions, and/or the like. In another example, the apparatus 200 may determine whether the first GCS is experiencing a software fault, hardware fault, and/or the like. In another example, the apparatus 200 may determine whether the first GCS is experiencing an emergency, such as a power failure, communication failure, fire, water damage, and/or the like. In still another example, the apparatus 200 may determine whether a GCS operating entity for the first GCS is experiencing an emergency or demonstrating off-nominal activity, such as incapacitation, abnormal vitals (e.g., heart rate, respiratory rate, and/or the like), fatigue (e.g., sluggish motor control, poor reaction time, lack of eye focus), inattentiveness, and/or the like. In some embodiments, in response to detecting (or receiving an indication of) off-nominal activity or an off-nominal event at the first GCS, the apparatus 200 determines that one or more vehicles, vehicle clusters, or subset of vehicles of a vehicle cluster should be handed over (e.g., reassigned) from the first GCS to a second GCS. For example, in response to detecting that the first GCS has experienced a software crash, the apparatus 200 may determine that vehicles assigned to the first GCS should be reassigned to one or more GCSs at the same GCC.

At operation 809, the apparatus 200 includes means such as the GCC controlling circuitry, the GCS controlling circuitry, the communications circuitry 205, the input/output circuitry 207, the processor 201, and/or the like, or a combination thereof, that receive a control change indication indicative of reassignment of the one or more vehicles, vehicle clusters, or subsets thereof, from the first GCS to a second GCS. For example, the apparatus 200 may receive the control change indication. In some embodiments, the apparatus 200 receives (or generates) the control change indication in response to detecting off-nominal activities, events, or emergencies at the first GCS. For example, the apparatus 200 may automatically receive the control change indication from the GCC (or GCC operating entity) in response to the first GCS experiencing a software fault, hardware fault, power failure, communication failure, and/or the like. In another example, the apparatus 200 may automatically receive the control change indication in response to the first GCS experiencing a threshold-exceeding number of off-nominal contingency cases respective to a plurality of vehicles assigned to the first GCS. The off-nominal contingency cases may include adverse weather, increase in air traffic, detection of potential collision sources along a travel path (e.g., other vehicles, objects, and/or the like), or compromised vehicle statuses (e.g., rotor damage, engine damage, power supply issue), compromised vehicle payload, and/or the like. In another example, the apparatus 200 may automatically generate the control change indication in response to detecting a near collision or deviation from a travel of one or more vehicles assigned to the first GCS (e.g., the near collision or deviation being indicative of off-nominal performance of the GCS operating entity).

In some embodiments, the apparatus 200 receives (or generates) the control change indication in response to a workload of the first GCS exceeding a predetermined threshold. For example, a GCC operating entity, the first GCS, or an associated GCS operating entity may determine that a number of vehicles, vehicle clusters, or subset of vehicles in a vehicle cluster, currently assigned to the first GCS exceeds a predetermined threshold and, in response, provide the control change indication to the apparatus 200. In another example, a GCS operating entity for the first GCS determines that a current workload is overwhelming and, in response, provides user input for requesting handover of one or more currently assigned vehicles, vehicle clusters, missions, and/or the like, to another GCS. The first GCS may receive the user input and, in response, provide the control change indication to the apparatus 200. In some embodiments, the first GCS and/or associated GCS operating entity performs a workload self-assessment to indicate whether a currently assigned workload is nominal or overwhelming. The workload self-assessment may include a graphical user interface (GUI) rendered on the first GCS that receives user input for indicating nominal workload, underbalanced workload, or overloaded workload. The apparatus 200 may receive or generate an outcome of the workload self-assessment based on the user input, where an outcome of overloaded workload may result in the apparatus 200 receiving or generating the control change indication.

At operation 812, the apparatus 200 includes means such as the GCC controlling circuitry, the GCS controlling circuitry, the communications circuitry 205, the input/output circuitry 207, the processor 201, and/or the like, or a combination thereof, that determine an availability of a second GCS at the GCC. For example, the apparatus 200 may determine an availability of a second GCS 105 at the GCC 103. In some embodiments, the apparatus 200 determines a status of the second GCS (and potentially additional GCSs at the GCC) to determine whether the one or more vehicles, vehicle clusters, or subset thereof, currently assigned to the first GCS may be reassigned to the second GCS. For example, the apparatus 200 may determine whether the second GCS is associated with a status of online, busy, nominal activity in managing currently assigned vehicles, off-nominal activity in managing currently assigned vehicles, and/or the like, where a status of online or nominal activity may indicate the second GCS is available to receive the reassignment. In another example, the apparatus 200 may determine that the second GCS is available in response to determining that a number of vehicles, vehicle clusters, and/or the like, currently assigned to the second GCS is less than a predetermined threshold.

At operation 815, the apparatus 200 includes means such as the GCC controlling circuitry, the GCS controlling circuitry, the communications circuitry 205, the input/output circuitry 207, the processor 201, and/or the like, or a combination thereof, that optionally receive an acceptance of reassignment of the vehicle or vehicle cluster from the second GCS. For example, the apparatus 200 may receive the acceptance of reassignment from the second GCS (e.g., or from the GCC, which may receive and relay the acceptance of reassignment from the second GCS to the apparatus 200). In some embodiments, the apparatus 200 prompts the second GCS to provide a status of availability by which the apparatus 200 may determine whether to reassign the vehicle, vehicle cluster, and/or the like, from the first GCS to the second GCS. In some embodiments, the apparatus 200 provides a notification to the second GCS, which may be rendered on a display of the second GCS. The notification may indicate mission data, vehicle cluster data, and/or other data associated with or indicative of the vehicle, vehicle cluster, and/or the like targeted for handover. In some embodiments, the apparatus 200 causes rendering of a graphical user interface (GUI) at the second GCS including selectable fields for indicating acceptance or rejection of reassignment of the vehicle, vehicle cluster, and/or the like to the second GCS. In some embodiments, in response to receiving user input indicative of acceptance of the reassignment, the apparatus 200 reassigns, in real-time, the vehicle, vehicle cluster, and/or the like from the first GCS to the second GCS. In some embodiments, in response to receiving user input indicative of rejection of the reassignment, the apparatus 200 may repeat operations for determining availability of other GCSs at the GCC to receive the reassignment.

At operation 818, the apparatus 200 includes means such as the GCC controlling circuitry, the GCS controlling circuitry, the communications circuitry 205, the input/output circuitry 207, the processor 201, and/or the like, or a combination thereof, that reassign the vehicle, vehicle cluster, and/or the like, from the first GCS to the second GCS. For example, the apparatus 200 may reassign a subset of a plurality of vehicles assigned to the first GCS to the second GCS such that the reassignment enables the second GCS to newly access data for controlling the subset of the plurality of vehicles. In some embodiments, the apparatus 200 reassigns the vehicle, vehicle cluster, and/or the like, by enabling the second GCS to access data corresponding to the reassigned vehicle, vehicle cluster, and/or the like. The data may be centrally stored at the GCC as a subset of master control data and accessed by the second GCS via the apparatus 200 and an application server associated with the second GCS. Additionally, or alternatively, the data, or a portion thereof, may be stored at the second GCS, such as by the apparatus 200 copying the data, or portion thereof, to memory of the second GCS and/or by the apparatus 200 causing the second GCS to access the data from one or more data stores using an application server and/or the like. In some embodiments, the data includes mission data, vehicle cluster data, and/or the like, associated with the reassigned vehicle or vehicle cluster. In one example, the data includes one or more vehicle statuses, a flight plan or other travel plan, location data (e.g., including data by conferring access to real-time vehicle or vehicle cluster location monitoring), air traffic data, weather data, a history of communication between the first GCS and/or GCS operating entity and one or more airspace-controlling entities, one or more roaming conditions, and/or the like. In some embodiments, the apparatus 200 disables the first GCS from accessing the data corresponding to the reassigned vehicle, vehicle cluster, and/or the like.

At operation 821, the apparatus 200 includes means such as the GCC controlling circuitry, the GCS controlling circuitry, the communications circuitry 205, the input/output circuitry 207, the processor 201, and/or the like, or a combination thereof, that perform one or more appropriate actions. For example, the apparatus 200 may perform one or more appropriate actions to notify affected GCS operating entities of the vehicle handover, to cause rendering of ground user interfaces at one or more GCSs, to update one or more ground user interfaces, and/or the like. In some embodiments, in response to reassigning the vehicle, vehicle cluster, and/or the like from the first GCS to the second GCS, the apparatus 200 provides a notification to the first GCS and/or the second GCS to indicate the reassignment. In one example, the apparatus 200 (or GCC) may provide a first notification to the first GCS that indicates the acceptance of and reassignment of a vehicle to the second GCS. Additionally, or alternatively, the apparatus 200 (or GCC) may provide a second notification to the second GCS that confirms the assignment of the vehicle to the second GCS. In some embodiments, the apparatus 200 provides a notification to the first GCS prior to performing the reassignment but following determination that the second GCS will receive the reassignment, thereby confirming to the first GCS that vehicle handover will occur. In some embodiments, the apparatus 200 stores (or causes the GCC or second GCS to store) data corresponding to the one or more vehicles, vehicle clusters, missions, and/or the like that were reassigned to the second GCS to enable the second GCS to control and monitor the one or more vehicles, vehicle clusters, missions, and/or the like. In some embodiments, the data corresponding to the one or more vehicles, vehicle clusters, missions, and/or the like includes vehicle cluster data, mission data, and/or the like (e.g., which may be embodied as one or more mission data objects). For example, the data corresponding to the one or more vehicles, vehicle clusters, missions, and/or the like may include mission data that indicates a travel pathway, destination, payload, roaming conditions, and/or the like. In another example, the data corresponding to the one or more vehicles, vehicle clusters, missions, and/or the like includes vehicle cluster data that indicates one or more vehicle identifiers, tactical information for vehicle control (e.g., available commands, vehicle statuses, and/or the like), navigation information vehicle tracking (e.g., geolocation data, bearing, locations of geozones, natural or artificial boundaries, locations of other GCCs, location associated with a payload or travel pathway, and/or the like).

In some embodiments, based on the reassignment, the apparatus 200 causes rendering of a ground control interface at the second GCS or causes a currently rendered ground control interface to be updated. In some embodiments, the ground control interface includes mission data, vehicle cluster data, and/or the like that indicates one or more mission data objects corresponding to the reassigned vehicle, vehicle cluster, and/or the like. The mission data object may include tactical data, fleet/planning data, navigation data, statuses, and/or the like that are associated with the reassigned vehicle, vehicle cluster, and/or the like. In some embodiments, the ground control interface includes a fleet/planning interface, tactical interface, and/or navigation interface that is/are updated to indicate data associated with the reassigned vehicle, vehicle cluster, and/or the like. In some embodiments, the apparatus 200 causes updating of a ground control interface at the first GCS to remove mission data, vehicle data, and/or the like corresponding to the reassigned vehicle, vehicle cluster, and/or the like. For example, the apparatus 200 may cause a ground control interface to be updated such that data corresponding to a reassigned vehicle is no longer displayed.

FIG. 9 illustrates a flowchart depicting operations of an example process for vehicle roaming using ground control centers (GCCs) in accordance with at least some example embodiments of the present disclosure. Specifically, FIG. 9 depicts operations of an example process 900. In some embodiments, the process 800 is embodied by computer program code stored on a non-transitory computer-readable storage medium of a computer program product configured for execution to perform the process as depicted and described. Additionally, or alternatively, in some embodiments, the process 900 is performed by one or more specially configured computing devices, such as the master control apparatus ("apparatus") 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 203 and/or another component depicted and/or described herein and/or otherwise accessible to the apparatus 200, for performing the operations as depicted and described. In some embodiments, the apparatus 200 is in communication with one or more internal or external apparatus(es), system(s), device(s), and/or the like, to perform one or more of the operations as depicted and described. For example, the apparatus 200 in some embodiments is in communication with a first GCC, a GCC operating entity associated with the first GCC, one or more GCSs associated with the first GCC, a respective GCS operating entity associated with each GCS, and a second apparatus 200 (e.g., associated with a second GCC and one or more GCSs associated therewith). For purposes of simplifying the description, the process 900 is described as performed by and from the perspective of the apparatus 200. In some embodiments, the apparatus 200 initiates the process 900 in response to detecting or receiving an indication that one or more roaming conditions are satisfied, such as receipt of a request to roam one or more vehicles, vehicle clusters, missions, and/or the like, detection of an emergency at a GCC, detection of off-nominal activities or events at a GCC, GCS, or one or more associated vehicles, or any other suitable conditions for initiating reassignment of one or more vehicles, vehicle clusters, missions, and/or the like from a first GCC and first GCS at the first GCC to a second GCC and second GCS associated with the second GCC.

At operation 903, the apparatus 200 includes means such as the GCC controlling circuitry, the GCS controlling circuitry, the communications circuitry 205, the input/output circuitry 207, the processor 201, and/or the like, or a combination thereof, that monitor data associated with a first ground control station (GCS) and one or more vehicles assigned to the first GCS. For example, the apparatus 200 may monitor data associated with the first GCS and one or more vehicles assigned to the first GCS. In some embodiments, the first GCS is associated with a first GCC. For example, the first GCS may be located at or nearby a facility that embodies the first GCC. In some embodiments, the first GCC is land-based. In other embodiments, the first GCC is air-based, water-based, or space-based. For example, the first GCC may embody a portion of an aircraft, watercraft, or spacecraft and the first GCS may be located within the first GCC.

In some embodiments, the apparatus 200 monitors vehicle cluster data, mission data, GCS data, and/or GCS operating entity data associated with the first GCS, the first GCC, one or more vehicles or vehicle clusters assigned to the first GCS and/or first GCC, and/or the like. For example, the apparatus 200 may receive a location of each vehicle assigned to the first GCS. In some embodiments, the apparatus 200 receives from the first GCC one or more indications of statuses of the first GCC and/or the first GCS. In some contexts, the status of the first GCC may include indications from one or more sensors or processing elements at the first GCC that detect off-nominal activities and events or emergency conditions, such as power failure, communication failure, facility overheat, equipment overheat, cyberattack, electromagnetic field disturbance, fire, flooding, biohazards, shocks and vibrations (e.g., from earthquakes, kinetic interactions, bomb blasts, wind conditions and/or the like), vehicle collisions (or near collisions), deviation of one or more vehicles from a travel pathway, and/or the like. In one example, the data monitored by the apparatus 200 may include an indication of an emergency at the first GCC, such as a fire or flood. In another example, the data monitored by the apparatus 200 may include a power status of the first GCC, such as a status indicating a loss of main power, backup power, or all power at the first GCC. In still another example, the data monitored by the apparatus 200 may include a communication status of the first GCC and/or first GCS, such as a static indicating a loss of communication between the first GCC and the first GCS, a loss of communication between the first GCS and/or first GCC and one or more vehicles, a loss of communication between the first GCC and one or more external systems (e.g., weather systems, navigation or tracking systems, air traffic systems, and/or the like), or a total failure of communication capability at the first GCC. In some embodiments, the status of the first GCS includes indications of GCS workload, GCS operating entity performance, GCS operating entity condition (e.g., biological signals such as heart rate, fatigue estimation, and/or the like), requests from the first GCS to reassign one or more vehicles, vehicle clusters, missions, and/or the like. In some embodiments, the status of the first GCS and/or first GCC indicates an unavailability of other GCSs at the first GCC to receive reassignment of one or more vehicles, vehicle clusters, missions, and/or the like assigned to the first GCS.

At operation 906, the apparatus 200 includes means such as the GCC controlling circuitry, the GCS controlling circuitry, the communications circuitry 205, the input/output circuitry 207, the processor 201, and/or the like, or a combination thereof, that optionally provide a roaming request to a second GCC. For example, the apparatus 200 of the first GCC associated with the first GCS may provide a roaming request to a second GCC. In some embodiments, the apparatus 200 of the first GCC provides the roaming request to the second GCC by providing the roaming request to a second master control apparatus ("apparatus") 200 that monitors and controls the second GCC. In some embodiments, the apparatus 200 of the first GCC provides the roaming request in response to receiving an indication of a user input to the first GCS. For example, the apparatus 200 of the first GCC may provide the roaming request to the second GCC in response to receiving an indication of user input to a graphical user interface (GUI) on the first GCS, where the user input indicates or confirms a request to roam one or more vehicles, vehicle clusters, missions, and/or the like from the first GCC to the second GCC. In some contexts, the user input may be provided by a GCS operating entity in response to the GCS operating entity determining that the vehicle or vehicle cluster is beyond a predetermined proximity of the first GCC, within a predetermined proximity of the second GCC, or beyond or within a predetermined proximity of one or more natural or artificial boundaries. In some embodiments, the roaming request includes data corresponding to the vehicle, vehicle cluster, and/or mission for which roaming is requested. For example, the roaming request includes mission data and/or vehicle cluster data, which may be embodied as a mission data object.

In some embodiments, in response to receiving the roaming request, the second GCC (or apparatus 200 in control thereof) causes rendering of a GUI at one or more GCSs associated with the second GCC. In some contexts, the GUI includes selectable fields for receiving user input indicative of an acceptance or rejection of the roaming request. In some embodiments, the GUI includes data corresponding to the vehicle, vehicle cluster, and/or mission for which roaming is requested. In some embodiments, the second GCC determines an availability of one or more GCSs to receive reassignment of the vehicle, vehicle cluster, and/or mission for which roaming is requested, where the availability may be based on GCS workload and/or GCS status (e.g., online, busy, off-nominal, nominal, offline, and/or the like). In some embodiments, the second GCC automatically determines a GCS capable of receiving the reassignment by determining one of a plurality of GCSs associated with a lowest current workload (e.g., least number of currently assigned vehicles, vehicle clusters, missions, and/or the like). In some embodiments, the second GCC provides the roaming request, or GUI for accepting or rejecting the roaming request, to one or more multiple GCSs.

At operation 909, the apparatus 200 includes means such as the GCC controlling circuitry, the GCS controlling circuitry, the communications circuitry 205, the input/output circuitry 207, the processor 201, and/or the like, or a combination thereof, that optionally receive an acceptance of the roaming request. For example, the apparatus 200 of the first GCC may receive an indication of acceptance of the roaming request. In some embodiments, the apparatus 200 receives the acceptance of the roaming request from the second GCC or a second apparatus 200 that controls and monitors the second GCC. In some embodiments, the acceptance of the request includes data indicative of one or more GCSs associated with the second GCC to which the vehicle, vehicle cluster, mission, and/or the like, may be reassigned from the first GCS of the first GCC. For example, the acceptance of the request may indicate one or more GCS identifiers. In other embodiments, the apparatus 200 of the first GCC receives a rejection of the roaming requests. In some embodiments, in response to receiving a rejection of the roaming request, the apparatus 200 notifies a GCS operating entity of the first GCS and/or provides additional roaming requests to other GCCs.

At operation 912, the apparatus 200 includes means such as the GCC controlling circuitry, the GCS controlling circuitry, the communications circuitry 205, the input/output circuitry 207, the processor 201, and/or the like, or a combination thereof, that determine whether the one or more roaming conditions are satisfied. For example, the apparatus 200 may determine whether the roaming condition is satisfied based on the data associated with the first GCS and one or more vehicles assigned to the first GCS and/or a response to a roaming request. In some embodiments, in response to the apparatus 200 determining satisfaction of the roaming condition is satisfied, the process 900 proceeds to operation 915. In some embodiments, in response to the apparatus 200 determining that the roaming condition is not satisfied, the process 900 proceeds to operation 903 at which the apparatus 200 may continue to monitor the data associated with the first GCC and one or more vehicles assigned to the first GCS.

In some embodiments, the apparatus 200 determines satisfaction of the roaming condition in response to detecting an indication that the location of the one or more vehicles is outside of a first geozone associated with the first GCC. In some embodiments, the apparatus 200 determines satisfaction of the roaming condition in response to detecting an indication that the location of the one or more vehicles is within a threshold distance of a second geozone associated with the second GCC. In some embodiments, the apparatus 200, determines satisfaction of the roaming condition in response to detecting an indication that the location of the one or more vehicles is within a threshold distance of an artificial boundary. In some embodiments, the apparatus 200 determines satisfaction of the roaming condition in response to receiving a request from the first GCS to roam one or more vehicles, vehicle clusters, missions, and/or the like (e.g., the request being provided via user input received at a GUI on the first GCS). In some embodiments, the apparatus 200 determines satisfaction of the roaming condition in response to receiving or detecting a power status indicating a power failure at the first GCC. In some embodiments, the apparatus 200 determines satisfaction of the roaming condition in response to receiving or detecting a communication status indicating a communication failure at the first GCC. In some embodiments, the apparatus 200 determines satisfaction of the roaming condition in response to receiving or detecting an indication of an emergency or off-nominal activity at the first GCC (e.g., fire, flood, biohazard, bomb blast, construction breakdown, overheat, electromagnetic field disturbances, off-nominal vehicle naviga-
tion, vehicle collision or near collision, and/or the like). In
some embodiments, the apparatus 200 determines satisfac-
tion of the roaming condition based on an indication of a
GCS workload at the first GCC. For example, the apparatus
200 may determine satisfaction of the roaming condition in
response to detecting that the currently assigned workload at
one or more GCSs associated with the first GCC exceeds a
GCS workload threshold, which may be indicated by the
roaming condition.

At operation 915, the apparatus 200 includes means such
as the GCC controlling circuitry, the GCS controlling cir-
cuitry, the communications circuitry 205, the input/output
circuitry 207, the processor 201, and/or the like, or a
combination thereof, that reassigns a vehicle, vehicle cluster,
mission, and/or the like from the first GCC to the second
GCC. For example, the apparatus 200 may reassign the
vehicle, vehicle cluster, mission, and/or the like from the
first GCC (e.g., and the first GCS associated with the first
GCC) to the second GCC (e.g., and one or more GCSs
associated with the second GCC). In some embodiments, the
apparatus 200 reassigns one or more vehicles, vehicle clus-
ters, missions, and/or the like by copying data corresponding
to the vehicle, vehicle cluster, mission, and/or the like from
the first GCC to the second GCC (or second apparatus 200
that monitors and controls the second GCC) to enable
control of the vehicle, vehicle cluster, mission, and/or the
like by one or more GCS associated with the second GCC.
In some embodiments, the apparatus 200 reassigns the one
or more vehicles, vehicle clusters, missions, and/or the like
in real-time from determining satisfaction of the one or more
roaming conditions at operation 912. For example, the
apparatus 200 may perform the reassignment in real-time
from detecting that a location of a vehicle assigned to the
first GCS of the first GCC is beyond a predetermined
proximity of the first GCC, within a predetermined proxim-
ity of the second GCC, and/or within or beyond a natural or
artificial boundary. In another example, the apparatus 200
may perform the reassignment in real-time to receiving an
acceptance of a roaming request from the second GCC.

At operation 918, the apparatus 200 includes means such
as the GCC controlling circuitry, the GCS controlling cir-
cuitry, the communications circuitry 205, the input/output
circuitry 207, the processor 201, and/or the like, or a
combination thereof, that optionally provide a notification
indicative of the reassignment of the one or more vehicles,
vehicle clusters, missions, and/or the like, to the first GCS
associated with the first GCC or a second GCS, or multiples
GCSs, associated with the second GCC. For example, the
apparatus 200 may provide to the first GCC a notification of
successful roaming of a vehicle from the first GCC to the
second GCC. In another example, the apparatus 200 may
provide to one or more GCSs associated with the second
GCC a notification that indicates reassignment of one or
more vehicles from the first GCC to the second GCC (e.g.,
and, further, to the one or more GCSs associated with the
second GCC).

At operation 921, the apparatus 200 includes means such
as the GCC controlling circuitry, the GCS controlling cir-
cuitry, the communications circuitry 205, the input/output
circuitry 207, the processor 201, and/or the like, or a
combination thereof, that perform one or more appropriate
actions to notify additional systems of the roaming opera-
tion, to cause rendering of ground user interfaces at one or
more GCSs, to update one or more ground user interfaces,
and/or the like. In some embodiments, in response to roam-
ing the vehicle, vehicle cluster, and/or the like from the first GCC to the second GCC, the apparatus 200 provides a
notification to an air traffic system, radar system, or other
external system to indicate the reassignment (e.g., where
such systems may be controlled by one or more airspace-
controlling entities). In some embodiments, the apparatus
200 causes rendering of (or updates) a ground control
interface at one or more GCSs at the second GCC to which
the vehicle, vehicle cluster, mission, and/or the like were
reassigned. In some embodiments, the ground control inter-
face includes mission data, vehicle cluster data, and/or the
like that indicates one or more mission data objects corre-
sponding to the reassigned vehicle, vehicle cluster, and/or
the like. The mission data object may include tactical data,
fleet/planning data, navigation data, statuses, and/or the like
that are associated with the reassigned vehicle, vehicle
cluster, and/or the like. In some embodiments, the ground
control interface includes a fleet/planning interface, tactical
interface, and/or navigation interface that is/are updated to
indicate data associated with the reassigned vehicle, vehicle
cluster, and/or mission. In some embodiments, the apparatus
200 causes updating of a ground control interface at the first
GCS to remove mission data, vehicle data, and/or the like
corresponding to the reassigned vehicle, vehicle cluster,
and/or mission.

CONCLUSION

Although an example processing system has been
described above, implementations of the subject matter and
the functional operations described herein can be imple-
mented in other types of digital electronic circuitry, or in
computer software, firmware, or hardware, including the
structures disclosed in this specification and their structural
equivalents, or in combinations of one or more of them.

Embodiments of the subject matter and the operations
described herein can be implemented in digital electronic
circuitry, or in computer software, firmware, or hardware,
including the structures disclosed in this specification and
their structural equivalents, or in combinations of one or
more of them. Embodiments of the subject matter described
herein can be implemented as one or more computer pro-
grams, i.e., one or more modules of computer program
instructions, encoded on computer storage medium for
execution by, or to control the operation of, information/data
processing apparatus. Alternatively, or in addition, the pro-
gram instructions can be encoded on an artificially-gener-
ated propagated signal, e.g., a machine-generated electrical,
optical, or electromagnetic signal, which is generated to
encode information/data for transmission to suitable
receiver apparatus for execution by an information/data
processing apparatus. A computer storage medium can be, or
be included in, a computer-readable storage device, a com-
puter-readable storage substrate, a random or serial access
memory array or device, or a combination of one or more of
them. Moreover, while a computer storage medium is not a
propagated signal, a computer storage medium can be a
source or destination of computer program instructions
encoded in an artificially-generated propagated signal. The
computer storage medium can also be, or be included in, one
or more separate physical components or media (e.g., mul-
tiple CDs, disks, or other storage devices).

The operations described herein can be implemented as
operations performed by an information/data processing
apparatus on information/data stored on one or more com-
puter-readable storage devices or received from other
sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   establishing a connection between a first ground control station (GCS) and a ground control center (GCC), the GCC associated with a master control system connected to the first GCS, wherein:
   the first GCS is assigned at least one vehicle to enable control of each vehicle of the at least one vehicle; and
   a respective vehicle of the at least one vehicle is associated with one of a plurality of mission data objects stored via the master control system of the GCC;
   receiving a control change indication from the first GCS or the master control system of the GCC, the control change indication indicative of reassignment of a subset of the at least one vehicle; and
   reassigning, in real-time from receiving the control change indication, the subset of the at least one vehicle from the first GCS to a second GCS associated with the GCC, wherein the reassignment to the second GCS enables the second GCS to control the subset of the at least one vehicle by newly accessing data corresponding to the subset of the at least one vehicle via the master control system.

2. The computer-implemented method of claim 1, further comprising:
   in response to reassigning the subset of the at least one vehicle from the first GCS to the second GCS, causing rendering of a ground control interface on the second GCS, wherein:
   the ground control interface comprises mission data indicative of a subset of the plurality of mission data objects; and
   the mission data is based on the data corresponding to the subset of the at least one vehicle that were reassigned.

3. The computer-implemented method of claim 1, further comprising:
   receiving the control change indication in response to a workload at the first GCS exceeding a predetermined threshold.

4. The computer-implemented method of claim 1, wherein:
   the data corresponding to the subset of the at least one vehicle is centrally stored at the GCC.

5. The computer-implemented method of claim 1, further comprising:
   receiving the control change indication in response to detection of an off-nominal event at the first GCS or at one of the subset of the at least one vehicle.

6. The computer-implemented method of claim 1, further comprising:
   receiving the control change indication in response to receipt of a user input at the first GCS, wherein the user input indicates a request to reassign the subset of the at least one vehicle.

7. The computer-implemented method of claim 1, further comprising:
   receiving the control change indication in response to detection of a fault at the first GCS.

8. The computer-implemented method of claim 1, further comprising:
   receiving the control change indication in response to detection of an emergency at the first GCS or an operating entity of the GCS.

9. The computer-implemented method of claim 1, wherein:
   the GCC is a first GCC; and
   the method further comprises:
      receiving a location for each of the at least one vehicle; and
      detecting an indication that the location of a particular vehicle of the subset of the at least one vehicle is outside of a first geozone associated with the first GCC or is within a threshold distance of a second geozone associated with a second GCC.

10. The computer-implemented method of claim 9, further comprising:
    in real-time from detecting the indication, reassigning the particular vehicle from the first GCC to the second GCC by copying the data corresponding to the particular vehicle from the master control system of the first GCC to a second master control system of the second GCC to enable control of the particular vehicle via at least one GCS of the second GCC.

11. An apparatus comprising at least one processor and at least one non-transitory memory having computer-coded instructions stored thereon that, in execution with at least one processor, cause the apparatus to:
    establish a connection between a first ground control station (GCS) and a ground control center (GCC), the GCC associated with a master control system connected to the first GCS, wherein:

the first GCS is assigned at least one vehicle to enable control of each vehicle of the at least one vehicle; and a respective vehicle of the at least one vehicle is associated with one of a plurality of mission data objects stored via the master control system of the GCC;

receive a control change indication from the first GCS or the master control system of the GCC, the control change indication indicative of reassignment of a subset of the at least one vehicle; and reassign, in real-time from receiving the control change indication, the subset of the at least one vehicle from the first GCS to a second GCS associated with the GCC, wherein the reassignment to the second GCS enables the second GCS to control the subset of the at least one vehicle by newly accessing data corresponding to the subset of the at least one vehicle via the master control system.

12. The apparatus of claim 11, wherein:

the data corresponding to the subset of the at least one vehicle comprises one or more vehicle statuses.

13. The apparatus of claim 12, wherein:

the data corresponding to the subset of the at least one vehicle further comprises a flight plan.

14. The apparatus of claim 13, wherein:

the data corresponding to the subset of the at least one vehicle further comprises a history of communication with one or more airspace-controlling entities.

15. The apparatus of claim 12, wherein:

the computer-code instructions, in execution with the at least one processor, further cause the apparatus to:

cause rendering of a ground control interface at the second GCS, wherein:

the ground control interface comprises:

a user input field indicative of a request to reassign the at least one vehicle from the first GCS to the second GCS; and mission data indicative of a subset of the plurality of mission data objects, wherein the mission data is based on the data corresponding to the subset of the at least one vehicle that were reassigned.

16. The apparatus of claim 15, wherein:

the computer-code instructions, in execution with the at least one processor, further cause the apparatus to:

receive, from the second GCS, user input to the user input field of the ground control interface, wherein:

the user input is indicative of an acceptance of reassignment of the subset of the at least one vehicle to the second GCS; and the apparatus reassigns, in real-time from receiving the user input, the subset of the at least one vehicle from the first GCS to the second GCS.

17. The apparatus of claim 11, wherein:

the computer-code instructions, in execution with the at least one processor, further cause the apparatus to:

update a rendering of a ground control interface at the first GCS to indicate reassignment of the subset of the at least one vehicle from the first GCS to the second GCS.

18. The apparatus of claim 11, wherein:

the computer-code instructions, in execution with the at least one processor, further cause the apparatus to:

enable an application server associated with the second GCS to access the data corresponding to the subset of the at least one vehicle.

19. The apparatus of claim 11, wherein:

the computer-code instructions, in execution with the at least one processor, further cause the apparatus to:

provide to the first GCS a notification indicating the reassignment of the subset of the at least one vehicle from the first GCS to the second GCS.

20. A computer program product comprising at least one non-transitory computer-readable storage medium having computer program code stored thereon that, in execution with at least one processor, is configured to:

establish a connection between a first ground control station (GCS) and a ground control center (GCC), the GCC associated with a master control system connected to the first GCS, wherein:

the first GCS is assigned at least one vehicle to enable control of each vehicle of the at least one vehicle; and a respective vehicle of the at least one vehicle is associated with one of a plurality of mission data objects stored via the master control system of the GCC;

receive a control change indication from the first GCS or the master control system of the GCC, the control change indication indicative of reassignment of a subset of the at least one vehicle; and reassign, in real-time from receiving the control change indication, the subset of the at least one vehicle from the first GCS to a second GCS associated with the GCC, wherein the reassignment to the second GCS enables the second GCS to control the subset of the at least one vehicle by newly accessing data corresponding to the subset of the at least one vehicle via the master control system.

* * * * *